United States Patent
Galati

(10) Patent No.: US 12,508,756 B2
(45) Date of Patent: Dec. 30, 2025

(54) METHOD AND APPARATUS FOR CONTROLLED INJECTION FLUID FLOW

(71) Applicant: Synventive Molding Solutions, Inc., Peabody, MA (US)

(72) Inventor: Vito Galati, Rowley, MA (US)

(73) Assignee: SYNVENTIVE MOLDING SOLUTIONS, INC., Peabody, MA (US)

( * ) Notice: Subject to any disclaimer, the term of this patent is extended or adjusted under 35 U.S.C. 154(b) by 364 days.

(21) Appl. No.: 18/090,779

(22) Filed: Dec. 29, 2022

(65) Prior Publication Data

US 2023/0140803 A1    May 4, 2023

Related U.S. Application Data

(63) Continuation of application No. PCT/US2021/015008, filed on Jan. 26, 2021.

(60) Provisional application No. 63/046,874, filed on Jul. 1, 2020, provisional application No. 63/054,102, filed on Jul. 20, 2020.

(51) Int. Cl.
  B29C 45/23    (2006.01)
  B29C 45/28    (2006.01)
  B29C 45/76    (2006.01)

(52) U.S. Cl.
  CPC ........ B29C 45/231 (2013.01); B29C 45/2806 (2013.01); B29C 45/7613 (2013.01)

(58) Field of Classification Search
  CPC .............. B29C 45/231; B29C 45/2806; B29C 45/7613
  See application file for complete search history.

(56) References Cited

U.S. PATENT DOCUMENTS

2016/0288388 A1   10/2016   Ling et al.
2018/0272587 A1    9/2018   Galati et al.

FOREIGN PATENT DOCUMENTS

WO    2019/156197 A1    8/2019

OTHER PUBLICATIONS

European Office Action for European Application No. 21705835.3; Report Mail Date Jul. 17, 2024 (5 Pages).
International Search Report and Written Opinion in related international application No. PCT/US2021/015008 issued on Apr. 16, 2021.

(Continued)

*Primary Examiner* — James Sanders
(74) *Attorney, Agent, or Firm* — CANTOR COLBURN LLP

(57) ABSTRACT

An injection molding apparatus (10) comprising:
  one or more valves each comprised of a valve pin (1040, 1041, 1042) adapted to be driven upstream and downstream through a downstream channel (1006) that has a downstream channel portion (1006*ds*) that has a control surface (1008),
  the control surface (1008) forming a channel or restriction gap (CG, 1006*rg*),
  the valve pin (1041) being controllably drivable upstream and downstream through the channel or restriction gap (CG, 1006*rg*) at a single selected rate of upstream acceleration up to a selected reduced upstream velocity that is less than a maximum velocity at which the valve pin (1041) is drivable,
  the size or configuration of the channel or restriction gap (CG, 1006*rg*) and the single selected rate of upstream acceleration being selected in combination with each other to control flow of injection fluid (18) through the channel gap (CG, 1006*rg*).

19 Claims, 16 Drawing Sheets

(56) References Cited

OTHER PUBLICATIONS

"Multispeed Valve-Pin Control Eliminating Hesitation Marks is Easier and More Cost-Effective with Multi-Speed Hydraulic Technology" by Christopher Barks, htts://www.moldmarkingtechnology.com/articles/multispeed-valve-pin-control [retrieved Jun. 7, 2018], Oct. 1, 2016.
International Search Report and Written Opinion in international application PCT/US2021/015005 issued on Apr. 23, 2021.
Christopher Barks: "Multispeed Valve-Pin Control Eliminating Hesitation Marks is Easier and More Cost-Effective with Multi-speed Hydraulic Technology", Oct. 1, 2016, retrieved from internet Jun. 7, 2018.
International Preliminary Report on Patentability in international application PCT/US2021/015005 issued on Dec. 13, 2022.
International Search Report and Written Opinion in international application PCT/US2021/015008 issued on Apr. 16, 2021.
International Preliminary Report on Patentability in international application PCT/US2021/015008 issued on Dec. 13, 2022.

2-Speed Opening

Opening Acceleration Control

METHOD AND APPARATUS FOR CONTROLLED INJECTION FLUID FLOW

RELATED APPLICATIONS

The disclosures of all of the following are incorporated by reference in their entirety as if fully set forth herein: U.S. Pat. Nos. 5,894,025, 6,062,840, 6,294,122 (7018), U.S. Pat. Nos. 6,309,208, 6,287,107, 6,343,921, 6,343,922, 6,254,377, 6,261,075, 6,361,300 (7006), U.S. Pat. Nos. 6,419,870, 6,464,909 (7031), U.S. Pat. No. 6,062,840 (7052), U.S. Pat. No. 6,261,075 (7052US1), U.S. Pat. Nos. 6,599,116, 7,234,929 (7075US1), U.S. Pat. No. 7,419,625 (7075US2), U.S. Pat. No. 7,569,169 (7075US3), U.S. Pat. No. 8,297,836 (7087) U.S. patent application Ser. No. 10/214,118, filed Aug. 8, 2002 (7006), U.S. Pat. No. 7,029,268 (7077US1), U.S. Pat. No. 7,270,537 (7077US2), U.S. Pat. No. 7,597,828 (7077US3), U.S. patent application Ser. No. 09/699,856 filed Oct. 30, 2000 (7056), U.S. patent application Ser. No. 10/269,927 filed Oct. 11, 2002 (7031), U.S. application Ser. No. 09/503,832 filed Feb. 15, 2000 (7053), U.S. application Ser. No. 09/656,846 filed Sep. 7, 2000 (7060), U.S. application Ser. No. 10/006,504 filed Dec. 3, 2001, (7068), U.S. application Ser. No. 10/101,278 filed Mar. 19, 2002 (7070) and PCT Application No. PCT/US11/062099 (7100WO0) and PCT Application No. PCT/US11/062096 (7100WO1), U.S. Pat. Nos. 8,562,336, 8,091,202 (7097US1) and U.S. Pat. No. 8,282,388 (7097US2), U.S. Pat. No. 9,724,861 (7129US4), U.S. Pat. No. 9,662,820 (7129US3), Publication No. WO2015006261 (7135WO0), Publication No. WO2014209857 (7134WO0), Publication No. WO2016153632 (7149WO2), International publication no. WO2016153704 (7149WO4), U.S. Pat. No. 9,205,587 (7117US0), U.S. application Ser. No. 15/432,175 (7117US2) filed Feb. 14, 2017, U.S. Pat. No. 9,144,929 (7118US0), U.S. Publication No. 20170341283 (7118US3), International Application WO2017214387 (7163WO0), International Application PCT/US17/043029 (7165WO0) filed Jul. 20, 2017, International Application PCT/US17/043100 (7165WO1), filed Jul. 20, 2017 and International Application PCT/US17/036542 (7163WO0) filed Jun. 8, 2017 and International Application WO2018129015 (7169WO0), international application WO2018148407 (7170WO0), international application WO2018183810 (7171WO), international application WO2018175362, international application WO2018194961 (7174WO0), international application WO2018200660 (7176WO0), international application WO2019013868 (7177), international application WO2019100085 (7178WO0), international application WO 2020068285 (7182WO0), international application WO2020176479 (7185WO0). The disclosure of WO2022005 (7192WO0) is incorporated by reference in their entirety as if fully set forth herein.

BACKGROUND

Injection molding systems that withdraw valve pins from a gate closed position upstream at multiple or uncontrolled rates of acceleration and up to multiple subsequent intermediate velocities before reaching an end of stroke position and systems that have an internal nozzle channel that have a single taper configuration as shown in FIG. 1A have been employed in sequential gating applications.

SUMMARY OF THE INVENTION

In accordance with the invention there is provided an injection molding apparatus (10) comprising an injection molding machine (13) that injects a flow of injection fluid (18) to a heated manifold (40) that distributes the injection fluid (18) to a distribution channel that delivers the injection fluid to a gate (34, 36, 1000g, 3000gep) of a mold cavity (30, 3000), the injection molding apparatus (10) comprising:

one or more valves each comprised of an actuator (941, 942) interconnected to a valve pin (1041, 1042) having a linear axis (X) of travel in an arrangement wherein the actuator (941, 942) controllably drives an interconnected valve pin (1040, 1041, 1042) upstream and downstream through a downstream channel (1006) that has a downstream channel portion (1006ds) that has a control surface (1008), wherein the control surface (1008) is sloped or configured, conical, cylindrical, straight or curvilinear and forms a channel or restriction gap (CG, 1006rg) of selected size or configuration disposed upstream of the gate (34, 1000g, 3000gep) to the mold cavity (30, 3000), the valve pin (1041) having a distal axial portion (1041d1) adapted to be controllably driven upstream and downstream through the channel or restriction gap (CG, 1006rg), the actuator being adapted to drive the distal axial portion (1041d) upstream through the channel or restriction gap (CG, 1006rg) beginning from a gate closed, zero velocity position up to a selected reduced upstream velocity that is less than a maximum velocity at which the valve pin (1041) is drivable, the control surface (1008) being disposed along an axial length (CT) of the channel or restriction gap (CG, 1006rg) of between about 3 mm and about 6 mm, the control surface (1008) or a portion (1006dsp) of the control surface (1008) having a smallest radial diameter (CD) that is greater than a largest radial diameter (1041md) of the distal axial portion (1041d1) by between about 0.1 mm and about 0.8 mm.

In such an apparatus, the restriction gap (CG, 1006rg) and the valve pin are adapted to cooperate with each other to restrict flow of injection fluid through the downstream channel portion (1006ds) typically along a selected axial length (1006dsl) of the channel portion (1006ds) into the mold cavity (30, 300) at one or more selected reduced rates of injection fluid flow when the distal axial portion (1041d1) is withdrawn upstream through the downstream channel portion (1006ds), the one or more selected reduced rates being less than a maximum rate at which injection fluid flows when the valve pin is disposed in an end of stroke (EOS) position.

In such an apparatus the actuator is adapted to drive the distal axial portion (1041d) upstream through the channel or restriction gap (CG, 1006rg) beginning from a gate closed, zero velocity position at a single selected rate of upstream acceleration up to the selected reduced upstream velocity, the selected size or configuration of the channel or restriction gap (CG, 1006rg) and the single selected rate of upstream acceleration being selected in combination with each other to control flow of injection fluid (18) through the channel gap (CG, 1006rg) at a selected rate of flow on driving the distal axial portion (1041d1) upstream at the single selected rate of upstream acceleration beginning from the gate closed, zero velocity position.

In such an apparatus the downstream channel portion (1006ds) preferably includes an interior surface (1010) extending along a distal end portion (DS) of the downstream channel (1006) that is disposed immediately downstream of the control surface (1008) and is adapted to engage or mate with the exterior surface (1041*cs*) of the distal axial portion (1041*d*1) of the selected valve pin (1041) such that the selected gate (34, 100G) is closed when the selected valve pin (1041) is disposed in a position where the distal axial portion (1041*d*1) is disposed within the distal end portion (DS) of the downstream channel portion (1006*ds*).

In such an apparatus the downstream channel (1006) typically includes an upstream channel portion (1006*us*) that has a conical or tapered or sloped surface (1009) disposed upstream relative to the downstream channel portion (1006*ds*) and is sloped or angled (UAG) relative to the linear axis (A) or circumferential surface (1041*cs*) of the valve pin (1041) by an angle (UAG) and extends along an axial length (UCT) of the downstream channel (1006) such that flow of injection fluid (18) flows without significant restriction through the upstream channel portion (1006*us*).

The conical or tapered or sloped or configured surface (1008) is typically disposed along or within a distal interior surface of an insert or extension (1003) disposed within a distal end of a main nozzle body (1004).

The conical or sloped surface (1008) can be disposed or formed along or within a distal end interior surface of a main nozzle body (1004) or disposed or formed within a gate entry portion (3000*gep*) of the mold (3002).

In such an apparatus the rate of flow of injection fluid (18) through the channel gap (CG) is controllable to a selected rate of flow that is less than the maximum rate of flow by controllably driving the selected valve pin upstream at the single selected rate of upstream acceleration.

In such an apparatus, the actuator (1040, 1041, 1042) typically comprises an electric motor having an electrically driven rotor drivably interconnected to the valve pin in an arrangement that converts rotary motion of the rotor to linear motion of the valve pin (1041).

In such an apparatus, the gate (34, 36) of the one or more valves is disposed downstream of an upstream gate (32) of an upstream valve through which the injection fluid is injected into the cavity (30, 300) at a first time, the actuator (941, 942) driving the valve pin (1041, 1042) to open the gate (34, 36) at a second time following the first time such that the injection fluid injected through the gate (34, 36) is injected into a stream of injection fluid injected through the upstream gate (32) and has traveled downstream through the cavity (30, 300) past the gate (34, 36).

In such an apparatus, the valve pin is preferably adapted to be driven at the single selected rate of upstream acceleration up to the selected reduced upstream velocity over a path of travel of between about 1 mm and about 5 mm.

In such an apparatus the selected reduced upstream velocity is preferably less than about 75% of the maximum velocity.

In another aspect of the invention there is provided an injection molding apparatus (10) comprising an injection molding machine (13) that injects a flow of injection fluid (18) to a heated manifold (40) that distributes the injection fluid (18) to a distribution channel that delivers the injection fluid to a gate (32, 34, 36, 1000*g*, 3000*gep*) of a mold cavity (30, 3000), the injection molding apparatus (10) comprising:

one or more valves each comprised of an actuator (940, 941, 942) interconnected to a valve pin (1040, 1041, 1042) having a linear axis (X) of travel in an arrangement wherein the actuator (940, 941, 942) is adapted to controllably drive an interconnected valve pin (1040, 1041, 1042) upstream and downstream through a downstream channel (1006) that has a downstream channel portion (1006*ds*) that has a control surface (1008), wherein the control surface (1008) is sloped, conical, cylindrical, straight or curvilinear and forms a channel or restriction gap (CG, 1006*rg*) of selected size or configuration disposed upstream of the gate (34, 1000*g*, 3000*gep*) to the mold cavity (30, 3000), the valve pin (1041) having a distal axial portion (1041*d*1) adapted to be controllably drivable upstream and downstream through the channel or restriction gap (CG, 1006*rg*), the actuator being adapted to controllably drive the distal axial portion (1041*d*1) beginning from a gate closed, zero velocity position at a single selected rate of upstream acceleration up to a selected reduced upstream velocity that is less than a maximum velocity at which the valve pin (1041) is drivable, wherein the selected size or configuration of the channel or restriction gap (CG, 1006*rg*) and the single selected rate of upstream acceleration are selected in combination with each other to control flow of injection fluid (18) through the channel gap (CG, 1006*rg*) at a selected rate of flow on driving the distal axial portion (1041*d*1) upstream at the single selected rate of upstream acceleration beginning from the gate closed, zero velocity position to the selected upstream velocity greater than zero.

The size or volume of the channel or restricted gap (CG, 1006*rg*) is selected by selecting one or the other or both of an angle (AG) between the control surface (1008) and the linear axis (X) of travel of the valve pin (1041) and by selecting the control surface (1008) or a portion (1006*dsp*) of the control surface (1008) to have smallest diameter (CD, 1006*dsd*) that is greater than a largest diameter (1041*d*1*d*) of the distal axial portion (1041*d*1) by a selected distance.

The downstream channel (1006) of such an apparatus typically includes an upstream channel portion (1006*us*) that has a conical or tapered or sloped surface (1009) disposed upstream relative to the downstream channel portion (1006*ds*) and is sloped or angled (UAG) relative to the linear axis (A) or circumferential surface (1041*cs*) of the valve pin (1041) by an angle (UAG) and extends along an axial length (UCT) of the downstream channel (1006) such that flow of injection fluid (18) flows without significant restriction through the upstream channel portion (1006*us*).

In such an apparatus where the control surface (1008) is conical or sloped, the control surface is preferably sloped or angled (AG) relative to the linear axis (A) or circumferential surface (1041*cs*) of the valve pin (1041) by an angle (AG) of between about 3 degrees and about 6 degrees.

In such an apparatus where the control surface (1008) is conical or sloped, the angle (UAG) is greater than the angle (AG).

In such an apparatus where the control surface (1008) is conical or sloped, the control surface is typically disposed along an axial length (CT) of between about 3 mm and about 6 mm.

In such an apparatus the control surface (1008) or a portion (1006*dsp*) of the control surface (1008) typically has smallest radial diameter (CD, 1006*dsd*) that is greater than a largest radial diameter (1041*md*) of the distal axial portion (1041*d*1) by between about 0.1 mm and about 0.8 mm.

In such an apparatus, the downstream channel portion (1006*ds*) preferably includes an interior surface (1010) extending along a distal end portion (DS) of the downstream channel (1006) that is disposed immediately downstream of the control surface (1008) and is adapted to engage or mate with the exterior surface (1041*cs*) of the distal axial portion (1041*d*1) of the selected valve pin (1041) such that the selected gate (34, 100G) is closed when the selected valve pin (1041) is axially positioned or driven to a position where the distal axial portion (1041*d*1) is disposed within the distal end portion (DS) of the downstream channel portion (1006*ds*).

In such an apparatus the single selected rate of upstream acceleration is selected to reduce the rate of flow of injection fluid through the gate (32, 34) to a selected reduced rate of flow that is less than a maximum rate of flow at which the injection fluid (18) flows at an end of stroke (EOS) position.

In such an apparatus the conical or tapered or sloped surface (1008) is selectively sloped or angled relative to the linear axis (A) by an angle (AG) selected to create a restriction in flow of the injection fluid through the channel gap (CG) into the mold cavity (30, 1000) that enables a controllable acceleration or deceleration in rate of flow of injection fluid (1153) through the gate relative to acceleration or deceleration that occurs where the channel surface is straight or cylindrical by controllable positioning or driving of a distal axial portion (1041*d*1) of the selected valve pin (1041) along a path of travel within or through the channel gap (CG) beginning from a closed position downstream of the channel gap (CG) to a position upstream of the channel gap (CG) or beginning from a position upstream of the channel gap (CG) to a closed position downstream of the channel gap.

The conical or tapered or sloped or configured surface (1008) is typically disposed along or within a distal interior surface of an insert or extension (1003) disposed within a distal end of a main nozzle body (1004).

The conical or tapered or sloped or configured surface (1008) can be disposed or formed along or within a distal end interior surface of a main nozzle body (1004) or disposed or formed within a gate entry portion (3000*gep*) of the mold (3002).

In such an apparatus the rate of flow of injection fluid (18) through the channel gap (CG) is controllable to a selected rate of flow that is less than a maximum rate of flow by controllably driving the selected valve pin upstream at the single selected rate of upstream acceleration.

In such an apparatus, the actuator (1040, 1041, 1042) typically comprises an electric motor having an electrically driven rotor drivably interconnected to the valve pin in an arrangement that converts rotary motion of the rotor to linear motion of the valve pin (1041).

In such an apparatus, the gate (34, 36) of the one or more valves is disposed downstream of an upstream gate (32) of an upstream valve through which the injection fluid is injected into the cavity (30, 300) at a first time, the actuator (941, 942) driving the valve pin (1041, 1042) to open the gate (34, 36) at a second time following the first time such that the injection fluid injected through the gate (34, 36) is injected into a stream of injection fluid injected through the upstream gate (32) and has traveled downstream through the cavity (30, 300) past the gate (34, 36).

In such an apparatus, the valve pin is preferably adapted to be driven at the single selected rate of upstream acceleration up to the selected reduced upstream velocity over a path of travel of between about 1 mm and about 5 mm.

In such an apparatus the selected reduced upstream velocity is preferably less than about 75% of the maximum velocity.

In accordance with the invention there is provided an injection molding apparatus (10) comprising an injection molding machine (13) that injects a flow of injection fluid (18) to a heated manifold (40) that distributes the injection fluid (18) to a distribution channel that delivers the injection fluid to a gate (32, 34, 36, 1000*g*, 3000*gep*) of a mold cavity (30, 3000), the injection molding apparatus (10) comprising:

one or more valves each comprised of an actuator (940, 941, 942) interconnected to a valve pin (1040, 1041, 1042) in an arrangement wherein the actuator (940, 941, 942) controllably drives an interconnected valve pin (1040, 1041, 1042) upstream and downstream through a downstream channel (1006) that has a downstream channel portion (1006*ds*) that has a conical or tapered or sloped surface (1008) that is sloped or angled relative to a linear axis (A) along which the selected valve pin (1041) travels, wherein the conical or tapered or sloped wall surface (1008) forms a channel gap (CG) disposed upstream of the gate (34, 1000*g*, 3000*gep*) to the mold cavity (30, 3000), the selected valve pin (1041) having a configuration disposed along a distal axial portion (1041*d*1) of the selected valve pin (1041) that is adapted to be controllably driven upstream beginning from a gate closed, zero velocity position at a single selected rate of upstream acceleration to a selected upstream velocity greater than zero, wherein the slope or taper of the conical or sloped surface (1008) is selected to interact with the distal axial portion (1041*d*) such that flow of injection fluid (18) through the channel gap (CG) is controllable to a selected rate of flow by controllably driving the selected valve pin upstream at the single selected rate of upstream acceleration beginning from the gate closed, zero velocity position up to the a selected upstream velocity greater than zero.

The downstream channel (1006) of such an apparatus typically includes an upstream channel portion (1006*us*) that has a conical or tapered or sloped surface (1009) disposed upstream relative to the downstream channel portion (1006*ds*) and is sloped or angled (UAG) relative to the linear axis (A) or circumferential surface (1041*cs*) of the valve pin (1041) by an angle (UAG) of greater than about 6 degrees and extends along an axial length (UCT) of the downstream channel (1006) such that flow of injection fluid (18) flows without significant restriction through the upstream channel portion (1006*us*).

In such an apparatus the conical or tapered or sloped wall surface (1008) is preferably sloped or angled (AG) relative to the linear axis (A) or circumferential surface (1041*cs*) of the valve pin (1041) by an angle (AG) of between about 3 degrees and about 6 degrees.

In such an apparatus the conical or tapered or sloped surface (1008) is typically disposed along an axial length (CT) of between about 3 mm and about 6 mm.

In such an apparatus the control surface (1008) or a portion (1006*dsp*) of the control surface (1008) typically has a smallest radial diameter (CD) that is greater than a radial diameter (1041*md*) of the distal axial portion (1041*d*1) by between about 0.1 mm and about 0.8 mm.

In such an apparatus, the downstream channel portion (1006*ds*) preferably includes an interior surface (1010) extending along a distal end portion (DS) of the downstream channel (1006) that is disposed immediately downstream of the control surface (1008) and is adapted to engage or mate with the exterior surface (1041*cs*) of the distal axial portion (1041*d*1) of the selected valve pin (1041) such that the selected gate (34, 100G) is closed when the selected valve pin (1041) is axially positioned or driven to a position where the distal axial portion (1041*d*1) is disposed within the distal end portion (DS) of the downstream channel portion (1006*ds*).

In such an apparatus the conical or tapered or sloped surface (1008) is selectively sloped or angled relative to the linear axis (A) by an angle (AG) selected to create a restriction in flow of the injection fluid through the channel gap (CG) into the mold cavity (30, 1000) that enables a controllable acceleration or deceleration in rate of flow of injection fluid (1153) through the gate relative to acceleration or deceleration that occurs where the channel surface is straight or cylindrical by controllable positioning or driving of a distal axial portion (1041d1) of the selected valve pin (1041) along a path of travel within or through the channel gap (CG) beginning from a closed position downstream of the channel gap (CG) to a position upstream of the channel gap (CG) or beginning from a position upstream of the channel gap (CG) to a closed position downstream of the channel gap.

The conical or tapered or sloped surface (1008) is typically disposed along or within a distal interior surface of an insert or extension (1003) disposed within a distal end of a main nozzle body (1004).

The conical or tapered or sloped surface (1008) can be disposed or formed along or within a distal end interior surface of a main nozzle body (1004) or disposed or formed within a gate entry portion (3000gep) of the mold (3002).

In such an apparatus the rate of flow of injection fluid (18) through the channel gap (CG) is controllable to a selected rate of flow that is less than a maximum rate of flow by controllably driving the selected valve pin upstream at the single selected rate of upstream acceleration.

In such an apparatus, the actuator (1040, 1041, 1042) typically comprises an electric motor having an electrically driven rotor drivably interconnected to the valve pin in an arrangement that converts rotary motion of the rotor to linear motion of the valve pin (1041).

In such an apparatus, the gate (34, 36) of the one or more valves is disposed downstream of an upstream gate (32) of an upstream valve through which the injection fluid is injected into the cavity (30, 300) at a first time, the actuator (941, 942) driving the valve pin (1041, 1042) to open the gate (34, 36) at a second time following the first time such that the injection fluid injected through the gate (34, 36) is injected into a stream of injection fluid injected through the upstream gate (32) and has traveled downstream through the cavity (30, 300) past the gate (34, 36).

In such an apparatus, the valve pin is preferably adapted to be driven at the single selected rate of upstream acceleration up to the selected reduced upstream velocity over a path of travel of between about 1 mm and about 5 mm.

In such an apparatus the selected reduced upstream velocity is preferably less than about 75% of the maximum velocity.

In another aspect of the invention there is provided an injection molding apparatus (10) comprising an injection molding machine (13) that injects a flow of injection fluid (18) to a heated manifold (40) that distributes the injection fluid (18) to a distribution channel that delivers the injection fluid to a gate (32, 34, 36, 1000g, 3000gep) of a mold cavity (30, 3000), the injection molding apparatus (10) comprising:
  one or more valves each comprised of an actuator (940, 941, 942) interconnected to a valve pin (1040, 1041, 1042) in an arrangement wherein the actuator (940, 941, 942) controllably drives an interconnected valve pin (1040, 1041, 1042) upstream and downstream through a downstream channel (1006) that has a downstream channel portion (1006ds) that has a conical or tapered or sloped surface (1008) that is sloped or angled relative to a linear axis (A) along which the selected valve pin (1041) travels and an interior surface (1010) extending along a distal end portion (DS) of the downstream channel (1006) that is disposed immediately downstream of the control surface (1008) and is adapted to engage or mate with an exterior surface (1041cs) of the distal axial portion (1041d1) of the selected valve pin (1041) such that the selected gate (34, 100G) is closed when the selected valve pin (1041) is axially positioned or driven to a position where the distal axial portion (1041d1) is disposed within the distal end portion (DS) of the downstream channel portion (1006ds),
  wherein the conical or tapered or sloped surface (1008) forms a channel gap (CG) disposed upstream of the gate (34, 1000G, 3000gep) to the mold cavity (30, 3000), the selected valve pin (1041) having a configuration disposed along a distal axial portion (1041d1) of the selected valve pin (1041) that is adapted to be controllably driven upstream beginning from a position where the exterior surface (1041cs) of the distal axial portion (1041d1) is mated with the interior surface (1010) at a single selected rate of upstream acceleration to a selected upstream velocity greater than zero,
  wherein the slope or taper of the conical or sloped surface (1008) is selected to interact with the distal axial portion (1041d) such that flow of injection fluid (18) through the channel gap (CG) is controllable to a selected rate that is less than a maximum rate of flow by controllably driving the selected valve pin (1041) upstream at the single selected rate of upstream acceleration up to the selected upstream velocity greater than zero beginning with the distal axial portion being disposed at a position where the exterior surface (1041cs) is mated with the interior surface (1010).

The downstream channel (1006) of such an apparatus typically includes an upstream channel portion (1006us) that has a conical or tapered or sloped surface (1009) disposed upstream relative to the downstream channel portion (1006ds) and is sloped or angled (UAG) relative to the linear axis (A) or circumferential surface (1041cs) of the valve pin (1041) by an angle (UAG) of greater than about 6 degrees and extends along an axial length (UCT) of the downstream channel (1006) such that flow of injection fluid (18) flows without significant restriction through the upstream channel portion (1006us).

In such an apparatus, the actuator (1040, 1041, 1042) typically comprises an electric motor having an electrically driven rotor drivably interconnected to the valve pin in an arrangement that converts rotary motion of the rotor to linear motion of the valve pin (1041).

In such an apparatus the conical or tapered or sloped surface (1008) is preferably sloped or angled relative to the linear axis (A) or circumferential surface (1041cs) of the valve pin (1041) by an angle of between about 3 degrees and about 6 degrees.

In such an apparatus the conical or tapered or sloped surface (1008) is typically disposed along an axial length (CT) of between about 3 mm and about 6 mm.

In such an apparatus the control surface (1008) or a portion (1006dsp) of the control surface (1008) typically has a smallest radial diameter (CD) that is greater than a radial diameter (1041md) of the distal axial portion (1041d1) by between about 0.1 mm and about 0.8 mm.

In such an apparatus, the gate (34, 36) of the one or more valves is disposed downstream of an upstream gate (32) of an upstream valve through which the injection fluid is injected into the cavity (30, 300) at a first time, the actuator (941, 942) driving the valve pin (1041, 1042) to open the gate (34, 36) at a second time following the first time such that the injection fluid injected through the gate (34, 36) is injected into a stream of injection fluid injected through the upstream gate (32) and has traveled downstream through the cavity (30, 300) past the gate (34, 36).

In such an apparatus, the valve pin is preferably adapted to be driven at the single selected rate of upstream acceleration up to the selected reduced upstream velocity over a path of travel of between about 1 mm and about 5 mm.

In such an apparatus the selected reduced upstream velocity is preferably less than about 75% of the maximum velocity.

In another aspect of the invention there is provided an injection molding apparatus (10) comprising an injection molding machine (13) that injects a flow of injection fluid (18) to a heated manifold (40) that distributes the injection fluid (18) to a distribution channel that delivers the injection fluid to a gate (32, 34, 36, 1000g, 3000gep) of a mold cavity (30, 3000), the injection molding apparatus (10) comprising:

one or more valves each comprised of an actuator (940, 941, 942) interconnected to a valve pin (1040, 1041, 1042) in an arrangement wherein the actuator (940, 941, 942) controllably drives an interconnected valve pin (1040, 1041, 1042) upstream and downstream through a downstream channel (1006) that has a downstream channel portion (1006ds) that has a conical or tapered or sloped surface (1008) that is sloped or angled relative to a linear axis (A) along which the selected valve pin (1041) travels, wherein the conical or tapered or sloped surface (1008) forms a channel gap (CG) disposed upstream of the gate (34, 1000g, 3000gep) to the mold cavity (30, 3000), the selected valve pin (1041) having a configuration disposed along a distal axial portion (1041d1) of the selected valve pin (1041) that is adapted to be controllably driven downstream beginning from a selected open gate position (906o) that is upstream of a gate closed position (GC) at a single selected rate of downstream deceleration to the gate closed position (GC), wherein the slope or taper of the conical or sloped surface (1008) is selected to interact with the distal axial portion (1041d) such that flow of injection fluid (18) through the channel gap (CG) is controllable to a selected rate of flow by controllably driving the selected valve pin downstream at the single selected rate of downstream deceleration beginning from the selected open gate position (906o) to the gate closed position (GC).

The downstream channel (1006) of such an apparatus typically includes an upstream channel portion (1006us) that has a conical or tapered or sloped surface (1009) disposed upstream relative to the downstream channel portion (1006ds) and is sloped or angled (UAG) relative to the linear axis (A) or circumferential surface (1041cs) of the valve pin (1041) by an angle (UAG) of greater than about 6 degrees and extends along an axial length (UCT) of the downstream channel (1006) such that flow of injection fluid (18) flows without significant restriction through the upstream channel portion (1006us).

In such an apparatus, the actuator (1040, 1041, 1042) typically comprises an electric motor having an electrically driven rotor drivably interconnected to the valve pin in an arrangement that converts rotary motion of the rotor to linear motion of the valve pin (1041).

In such an apparatus the conical or tapered or sloped surface (1008) is preferably sloped or angled relative to the linear axis (A) or circumferential surface (1041cs) of the valve pin (1041) by an angle of between about 3 degrees and about 6 degrees.

In such an apparatus the conical or tapered or sloped surface (1008) is typically disposed along an axial length (CT) of between about 3 mm and about 6 mm.

In such an apparatus the conical or tapered or sloped surface (1008) has a smallest radial diameter (CD) or a portion (1006dsp) has a smallest radial diameter (CD) that is greater than a radial diameter (1041md) of the distal axial portion (1041d1) by between about 0.1 mm and about 0.8 mm.

In such an apparatus, the downstream channel portion (1006ds) preferably includes an interior surface (1010) extending along a distal end portion (DS) of the downstream channel (1006) that is disposed immediately downstream of the control surface (1008) and is adapted to engage or mate with the exterior surface (1041cs) of the distal axial portion (1041d1) of the selected valve pin (1041) such that the selected gate (34, 100G) is closed when the selected valve pin (1041) is axially positioned or driven to a position where the distal axial portion (1041d1) is disposed within the distal end portion (DS) of the downstream channel portion (1006ds).

In another aspect of the invention there is provided an injection molding apparatus (10) comprising an injection molding machine (13) that injects a flow of injection fluid (18) to a heated manifold (40) that distributes the injection fluid (18) to a distribution channel that delivers the injection fluid to a gate (32, 34, 36, 1000g, 3000gep) of a mold cavity (30, 3000), the injection molding apparatus (10) comprising:

one or more valves each comprised of an actuator (940, 941, 942) interconnected to a valve pin (1040, 1041, 1042) in an arrangement wherein the actuator (940, 941, 942) controllably drives an interconnected valve pin (1040, 1041, 1042) upstream and downstream through a downstream channel (1006) that has a downstream channel portion (1006ds) that has a conical or tapered or sloped surface (1008) that is sloped or angled relative to a linear axis (A) along which the selected valve pin (1041) travels, wherein the conical or tapered or sloped surface (1008) forms a channel gap (CG) disposed upstream of the gate (34, 1000g, 3000gep) to the mold cavity (30, 3000), the selected valve pin (1041) having a configuration disposed along a distal axial portion (1041d1) of the selected valve pin (1041) that is adapted to be controllably driven upstream beginning from a selected open gate position (904o) that is downstream of an open gate end of stroke position (EOS) at a single selected rate of upstream deceleration to the open gate end of stroke position (EOS), wherein the slope or taper of the conical or sloped surface (1008) is selected to interact with the distal axial portion (1041d) such that flow of injection fluid (18) through the channel gap (CG) is controllable by controllably driving the selected valve pin upstream at the single selected rate of upstream deceleration beginning from the selected open gate position (904o) to the open gate end of stroke position (EOS).

The downstream channel (1006) of such an apparatus typically includes an upstream channel portion (1006us) that has a conical or tapered or sloped surface (1009) disposed upstream relative to the downstream channel portion (1006ds) and is sloped or angled (UAG) relative to the linear axis (A) or circumferential surface (1041cs) of the valve pin (1041) by an angle (UAG) of greater than about 6 degrees and extends along an axial length (UCT) of the downstream channel (1006) such that flow of injection fluid (18) flows without significant restriction through the upstream channel portion (1006us).

In such an apparatus, the actuator (1040, 1041, 1042) typically comprises an electric motor having an electrically driven rotor drivably interconnected to the valve pin in an arrangement that converts rotary motion of the rotor to linear motion of the valve pin (1041).

In such an apparatus the conical or tapered or sloped surface (1008) is preferably sloped or angled relative to the linear axis (A) or circumferential surface (1041cs) of the valve pin (1041) by an angle of between about 3 degrees and about 6 degrees.

In such an apparatus the conical or tapered or sloped surface (1008) is typically disposed along an axial length (CT) of between about 3 mm and about 6 mm.

In such an apparatus the conical or tapered or sloped surface (1008) has a smallest radial diameter (CD) or a portion (1006dsp) or the control surface (1008) has a smallest radial diameter (CD) that is greater than a radial diameter (1041md) of the distal axial portion (1041d1) by between about 0.1 mm and about 0.8 mm.

In such an apparatus, the downstream channel portion (1006ds) preferably includes an interior surface (1010) extending along a distal end portion (DS) of the downstream channel (1006) that is disposed immediately downstream of the control surface (1008) and is adapted to engage or mate with the exterior surface (1041cs) of the distal axial portion (1041d1) of the selected valve pin (1041) such that the selected gate (34, 100G) is closed when the selected valve pin (1041) is axially positioned or driven to a position where the distal axial portion (1041d1) is disposed within the distal end portion (DS) of the downstream channel portion (1006ds).

In such an apparatus, the gate (34, 36) of the one or more valves is disposed downstream of an upstream gate (32) of an upstream valve through which the injection fluid is injected into the cavity (30, 300) at a first time, the actuator (941, 942) driving the valve pin (1041, 1042) to open the gate (34, 36) at a second time following the first time such that the injection fluid injected through the gate (34, 36) is injected into a stream of injection fluid injected through the upstream gate (32) and has traveled downstream through the cavity (30, 300) past the gate (34, 36).

In such an apparatus, the valve pin is preferably adapted to be driven at the single selected rate of upstream acceleration up to the selected reduced upstream velocity over a path of travel of between about 1 mm and about 5 mm.

In such an apparatus the selected reduced upstream velocity is preferably less than about 75% of the maximum velocity.

In another aspect of the invention there is provided an injection molding apparatus (10) comprising an injection molding machine (13) that injects a flow of injection fluid (18) to a heated manifold (40) that distributes the injection fluid (18) to a distribution channel that delivers the injection fluid to a gate (32, 34, 36, 1000g, 3000gep) of a mold cavity (30, 3000), the injection molding apparatus (10) comprising:
one or more valves each comprised of an actuator (940, 941, 942) interconnected to a valve pin (1040, 1041, 1042) that has a distal axial portion (1041d1) having a pin diameter or maximum radial dimension (1041d1d) in an arrangement wherein the actuator (940, 941, 942) controllably drives an interconnected valve pin (1040,

1041, 1042) upstream and downstream through a downstream channel (1006) that has a downstream channel portion (1006ds),
the downstream channel portion (1006ds) including an interior wall surface (1008) having a selected interior radial diameter (1006dsd) and a portion length (1006dsl) adapted to receive the distal axial portion (1041d1) of the valve pin (1041) such that the distal axial portion (1041d1) of the valve pin (1041) is reciprocally drivable upstream and downstream through the portion length (1006dsl),
the interior surface diameter or selected interior radial dimension (1006dsd) and the pin diameter or pin maximum radial dimension (1041d1d) being configured to form a flow restriction gap (1006rg) of selected size and configuration when the distal axial portion (1041d1) is received within the downstream channel portion (1006ds),
the distal axial portion (1041d1) being adapted to be controllably driven upstream beginning from a gate closed, zero velocity position at a single selected rate of upstream acceleration,
wherein the selected size and configuration of the restriction gap (1006rg) is selected such that flow of injection fluid (18) through the restriction gap (1006rg) is controllable to a selected rate of flow by controllably driving the valve pin (1041) upstream at the single selected rate of upstream acceleration beginning from the gate closed, zero velocity position.

In such an apparatus the distal axial portion (1041d1) is typically adapted to be controllably driven upstream beginning from a gate closed, zero velocity position at a single selected rate of upstream acceleration up to a selected upstream velocity greater than zero, the selected size and configuration of the restriction gap (1006rg) being selected such that flow of injection fluid (18) through the restriction gap (1006rg) is controllable to a selected reduced rate of flow relative to a maximum flow by controllably driving the valve pin (1041) upstream at the single selected rate of upstream acceleration beginning from the gate closed, zero velocity position up to the selected velocity.

In such an apparatus the downstream channel portion (1006ds) preferably includes an interior surface (1010) extending along a distal end portion (DS) of the downstream channel (1006) that is disposed immediately downstream of the portion length (1006dsl) and is adapted to engage or mate with the exterior surface (1041cs) of the distal axial portion (1041d1) of the selected valve pin (1041) such that the selected gate (34, 100G) is closed when the selected valve pin (1041) is axially positioned or driven to a gate closed position where the exterior surface (1041cs) is engaged or mated with the interior surface (1010).

In such an apparatus, the flow restriction gap (1006rg) is adapted to restrict flow of the injection fluid (1153) to a flow rate that is reduced relative to a higher flow rate that occurs when the distal axial portion (1041d1) is disposed upstream of the portion length (1006dsl) of the downstream channel portion (1006ds).

The downstream channel portion (1006ds) is typically disposed or formed along or within a distal interior channel volume of the main nozzle body (1004) or of an insert or extension (1003) that is disposed within a distal end of a main nozzle body (1004).

The downstream channel portion (1006ds) can be disposed or formed within a gate entry portion (3000gep) of the mold (3002), such that the distal axial portion (1041d1) of the valve pin (1041) is axially drivable through the channel portion (1006ds) within the gate entry portion (3000gep) of the mold (3002).

The distal axial portion (1041d1) typically has a portion length (1006dsl) along an axial path of travel of between about 1 mm and about 18 mm, more typically between about 2 mm and about 10 mm and more typically between about 2 mm and about 8 mm.

The exterior or circumferential surface (1041cs) can be straight, cylindrical, conical or sloped.

In such an apparatus, the actuator (1040, 1041, 1042) typically comprises an electric motor having an electrically driven rotor drivably interconnected to the valve pin in an arrangement that converts rotary motion of the rotor to linear motion of the valve pin (1041).

In such an apparatus, the gate (34, 36) of the one or more valves is disposed downstream of an upstream gate (32) of an upstream valve through which the injection fluid is injected into the cavity (30, 300) at a first time, the actuator (941, 942) driving the valve pin (1041, 1042) to open the gate (34, 36) at a second time following the first time such that the injection fluid injected through the gate (34, 36) is injected into a stream of injection fluid injected through the upstream gate (32) and has traveled downstream through the cavity (30, 300) past the gate (34, 36).

In such an apparatus, the valve pin is preferably adapted to be driven at the single selected rate of upstream acceleration up to the selected reduced upstream velocity over a path of travel of between about 1 mm and about 5 mm.

In such an apparatus the selected reduced upstream velocity is preferably less than about 75% of the maximum velocity.

In another aspect of the invention there is provided an injection molding apparatus (10) comprising an injection molding machine (13) that injects a flow of injection fluid (18) to a heated manifold (40) that distributes the injection fluid (18) to a distribution channel that delivers the injection fluid to a gate (32, 34, 36, 1000g, 3000gep) of a mold cavity (30, 3000), the injection molding apparatus (10) comprising:
one or more valves each comprised of an actuator (940, 941, 942) interconnected to a valve pin (1040, 1041, 1042) that has a distal axial portion (1041d1) having a pin diameter or maximum radial dimension (1041d1d) in an arrangement wherein the actuator (940, 941, 942) controllably drives an interconnected valve pin (1040, 1041, 1042) upstream and downstream through a downstream channel (1006) that has a downstream channel portion (1006ds),
the downstream channel portion (1006ds) including an interior wall surface (1008) having a selected interior radial diameter (1006dsd) and a portion length (1006dsl) adapted to receive the distal axial portion (1041d1) of the valve pin (1041) such that the distal axial portion (1041d1) of the valve pin (1041) is reciprocally drivable upstream and downstream through the portion length (1006dsl),
the interior surface diameter or selected interior radial dimension (1006dsd) and the pin diameter or pin maximum radial dimension (1041d1d) being configured to form a flow restriction gap (1006rg) of selected size and configuration when the distal axial portion (1041d1) is received within the downstream channel portion (1006ds),
the distal axial portion (1041d1) being adapted to be controllably driven downstream beginning from a selected open gate position (906o) that is upstream of a gate closed position (GC) at a single selected rate of downstream deceleration to the gate closed position (GC),
wherein the selected size and configuration of the restriction gap (1006rg) is selected such that flow of injection fluid (18) through the restriction gap (1006rg) is controllable to a selected rate of flow by controllably driving the selected valve pin downstream at the single selected rate of downstream deceleration beginning from the selected open gate position (906o) to the gate closed position (GC).

In such an apparatus the downstream channel portion (1006ds) preferably includes an interior surface (1010) extending along a distal end portion (DS) of the downstream channel (1006) that is disposed immediately downstream of the portion length (1006dsl) and is adapted to engage or mate with the exterior surface (1041cs) of the distal axial portion (1041d1) of the selected valve pin (1041) such that the selected gate (34, 100G) is closed when the selected valve pin (1041) is axially positioned or driven to a gate closed position where the exterior surface (1041cs) is engaged or mated with the interior surface (1010).

In such an apparatus, the flow restriction gap (1006rg) is adapted to restrict flow of the injection fluid (1153) to a flow rate that is reduced relative to a higher flow rate that occurs when the distal axial portion (1041d1) is disposed upstream of the portion length (1006dsl) of the downstream channel portion (1006ds).

The downstream channel portion (1006ds) is typically disposed or formed along or within a distal interior channel volume of the main nozzle body (1004) or of an insert or extension (1003) that is disposed within a distal end of a main nozzle body (1004).

The downstream channel portion (1006ds) can be disposed or formed within a gate entry portion (3000gep) of the mold (3002), such that the distal axial portion (1041d1) of the valve pin (1041) is axially drivable through the channel portion (1006ds) within the gate entry portion (3000gep) of the mold (3002).

The distal axial portion (1041d1) typically has a portion length (1006dsl) along an axial path of travel of between about 1 mm and about 18 mm, more typically between about 2 mm and about 10 mm and more typically between about 2 mm and about 8 mm.

The exterior or circumferential surface (1041cs) can be straight, cylindrical, conical or sloped.

In such an apparatus, the actuator (1040, 1041, 1042) typically comprises an electric motor having an electrically driven rotor drivably interconnected to the valve pin in an arrangement that converts rotary motion of the rotor to linear motion of the valve pin (1041).

In such an apparatus, the gate (34, 36) of the one or more valves is disposed downstream of an upstream gate (32) of an upstream valve through which the injection fluid is injected into the cavity (30, 300) at a first time, the actuator (941, 942) driving the valve pin (1041, 1042) to open the gate (34, 36) at a second time following the first time such that the injection fluid injected through the gate (34, 36) is injected into a stream of injection fluid injected through the upstream gate (32) and has traveled downstream through the cavity (30, 300) past the gate (34, 36).

In such an apparatus, the valve pin is preferably adapted to be driven at the single selected rate of upstream acceleration up to the selected reduced upstream velocity over a path of travel of between about 1 mm and about 5 mm.

In such an apparatus the selected reduced upstream velocity is preferably less than about 75% of the maximum velocity.

In another aspect of the invention there is provided an injection molding apparatus (10) comprising an injection molding machine (13) that injects a flow of injection fluid (18) to a heated manifold (40) that distributes the injection fluid (18) to a distribution channel that delivers the injection fluid to a gate (32, 34, 36, 1000g, 3000gep) of a mold cavity (30, 3000), the injection molding apparatus (10) comprising:
- one or more valves each comprised of an actuator (940, 941, 942) interconnected to a valve pin (1040, 1041, 1042) that has a distal axial portion (1041d1) having a pin diameter or maximum radial dimension (1041d1d) in an arrangement wherein the actuator (940, 941, 942) controllably drives an interconnected valve pin (1040, 1041, 1042) upstream and downstream through a downstream channel (1006) that has a downstream channel portion (1006ds),
- the downstream channel portion (1006ds) including an interior wall surface (1008) having a selected interior radial diameter (1006dsd) and a portion length (1006dsl) adapted to receive the distal axial portion (1041d1) of the valve pin (1041) such that the distal axial portion (1041d1) of the valve pin (1041) is reciprocally drivable upstream and downstream through the portion length (1006dsl),
- the interior surface diameter or selected interior radial dimension (1006dsd) and the pin diameter or pin maximum radial dimension (1041d1d) being configured to form a flow restriction gap (1006rg) of selected size and configuration along a portion length (1006dsl) when the distal axial portion (1041d1) is received within the downstream channel portion (1006ds),
- the distal axial portion (1041d1) being adapted to be controllably driven upstream beginning from a selected open gate position (904o) that is downstream of a gate open end of stroke position (EOS) at a single selected rate of upstream deceleration to the gate open end of stroke position (EOS),
- wherein the selected size and configuration of the restriction gap (1006rg) is selected such that flow of injection fluid (18) through the restriction gap (1006rg) is controllable to a selected rate of flow by controllably driving the selected valve pin upstream at the single selected rate of upstream deceleration beginning from the selected open gate position (904o) to the gate open end of stroke position (EOS).

In such an apparatus the downstream channel portion (1006ds) preferably includes an interior surface (1010) extending along a distal end portion (DS) of the downstream channel (1006) that is disposed immediately downstream of the portion length (1006dsl) and is adapted to engage or mate with the exterior surface (1041cs) of the distal axial portion (1041d1) of the selected valve pin (1041) such that the selected gate (34, 100G) is closed when the selected valve pin (1041) is axially positioned or driven to a gate closed position where the exterior surface (1041cs) is engaged or mated with the interior surface (1010).

In such an apparatus, the flow restriction gap (1006rg) is adapted to restrict flow of the injection fluid (1153) to a flow rate that is reduced relative to a higher flow rate that occurs when the distal axial portion (1041d1) is disposed upstream of the portion length (1006dsl) of the downstream channel portion (1006ds).

The downstream channel portion (1006ds) is typically disposed or formed along or within a distal interior channel volume of the main nozzle body (1004) or of an insert or extension (1003) that is disposed within a distal end of a main nozzle body (1004).

The downstream channel portion (1006ds) can be disposed or formed within a gate entry portion (3000gep) of the mold (3002), such that the distal axial portion (1041d1) of the valve pin (1041) is axially drivable through the channel portion (1006ds) within the gate entry portion (3000gep) of the mold (3002).

The distal axial portion (1041d1) typically has a portion length (1006dsl) along an axial path of travel of between about 1 mm and about 18 mm, more typically between about 2 mm and about 10 mm and more typically between about 2 mm and about 8 mm.

The exterior or circumferential surface (1041cs) can be straight, cylindrical, conical or sloped.

In such an apparatus, the actuator (1040, 1041, 1042) typically comprises an electric motor having an electrically driven rotor drivably interconnected to the valve pin in an arrangement that converts rotary motion of the rotor to linear motion of the valve pin (1041).

In such an apparatus, the gate (34, 36) of the one or more valves is disposed downstream of an upstream gate (32) of an upstream valve through which the injection fluid is injected into the cavity (30, 300) at a first time, the actuator (941, 942) driving the valve pin (1041, 1042) to open the gate (34, 36) at a second time following the first time such that the injection fluid injected through the gate (34, 36) is injected into a stream of injection fluid injected through the upstream gate (32) and has traveled downstream through the cavity (30, 300) past the gate (34, 36).

In such an apparatus, the valve pin is preferably adapted to be driven at the single selected rate of upstream acceleration up to the selected reduced upstream velocity over a path of travel of between about 1 mm and about 5 mm.

In such an apparatus the selected reduced upstream velocity is preferably less than about 75% of the maximum velocity.

In all such apparatuses described herein the apparatus can further comprise a position sensor (951, 952) adapted to sense position of the valve pin (141) or the actuator (941, 942), the position sensor being interconnected to and adapted to send one or more signals indicative of the position to the controller (16);
- the controller including instructions that utilize the one or more signals indicative of the position to control the upstream rate of travel at any one or more of:
  - (a) a selected rate of downstream deceleration (906) beginning from a selected position (906o) upstream of the gate closed position (GC) to the gate closed (GC) position,
  - (b) a selected rate of downstream deceleration (920) beginning from a selected intermediate upstream position (920o) to an intermediate zero velocity position (912),
  - (c) a selected rate of upstream deceleration (914) beginning from a selected intermediate position (914o) upstream of the gate closed position (GC) to an intermediate zero velocity position (916),
  - (d) a selected rate of downstream acceleration (908) beginning from an end of stroke (EOS) position or from an intermediate upstream zero velocity position (912),
  - (e) a selected rate of downstream deceleration (920) beginning from a selected intermediate upstream position (920o) to an intermediate zero velocity position (912), (f) a selected constant velocity or rate of travel upstream or downstream over any portion of a duration of an injection cycle, (g) a selected zero velocity over any portion of a duration of an injection cycle.

In another aspect of the invention there is provided a method of performing an injection cycle comprising:

sensing a position of the valve pin (141) or the actuator (941, 942)

utilizing the one or more signals indicative of the position to control the upstream rate of travel during the course of an injection cycle at any one or more of:

(a) a single selected rate of upstream acceleration beginning from a gate closed position (GC) up to a selected upstream position that is downstream of an end of stroke position, (b) a selected rate of downstream deceleration (906) beginning from a selected position (906o) upstream of the gate closed position (GC) to the gate closed (GC) position, (c) a selected rate of downstream deceleration (920) beginning from a selected intermediate upstream position (920o) to an intermediate zero velocity position (912), (d) a selected rate of upstream deceleration (914) beginning from a selected intermediate position (914o) upstream of the gate closed position (GC) to an intermediate zero velocity position (916), (e) a selected rate of downstream acceleration (908) beginning from an end of stroke (EOS) position or from an intermediate upstream zero velocity position (912), (f) a selected rate of downstream deceleration (920) beginning from a selected intermediate upstream position (920o) to an intermediate zero velocity position (912), (g) a selected constant velocity or rate of travel upstream or downstream over any portion of a duration of an injection cycle, (h) a selected zero velocity over any portion of a duration of an injection cycle.

In another aspect of the invention there is provided a method of performing an injection molding cycle in an injection molding apparatus (10) comprising an injection molding machine (13) that injects a flow of injection fluid (18) to a heated manifold (40) that distributes the injection fluid (18) to a distribution channel that delivers the injection fluid to a gate (34, 36, 1000g, 3000gep) of a mold cavity (30, 3000) via one or more valves each comprised of an actuator (941, 942) interconnected to a valve pin (1041, 1042) having a linear axis (X) of travel, the method comprising:

controlling the actuator (941, 942) to drive an interconnected valve pin (1041, 1042) having a distal axial portion (1041d1) having a selected distal configuration (1041cs) upstream and downstream through a downstream channel (1006) that has a downstream channel portion (1006ds) that has a control surface (1008) having a selected control surface configuration, configuring the selected distal configuration (1041cs) of the valve pin (1041, 1042) and the selected control surface configuration of the control surface (1008) to interact with each other along a select path of upstream travel (1006dsl) of the valve pin beginning from a gate closed position (GC) to restrict rate of flow of the injection fluid (18) through the gate (34, 36) to less than a maximum rate of flow, controllably driving the actuator (941, 942) to drive the distal axial portion (1041d1) beginning from the gate closed, zero velocity position (GC) at a single selected rate of upstream acceleration (900) through the select path of upstream travel (1006dsl).

In such a method the actuator (941, 942) can be controllably driven to drive the distal axial portion (1041d1) beginning from the gate closed, zero velocity position (GC) at the single selected rate of upstream acceleration (900) up to a selected constant upstream velocity (902).

The selected constant upstream velocity (902) is typically less than a maximum velocity at which the valve pin (1041) is drivable.

In such a method the single selected rate of upstream acceleration (900) beginning from the gate closed, zero velocity position is typically selected to control flow of injection fluid (18) through the gate (34, 36) at a selected rate of flow of injection fluid (18) on driving the distal axial portion (1041d1) upstream at the single selected rate of upstream acceleration beginning from the gate closed, zero velocity position.

In such a method the single selected rate of upstream acceleration (900) is typically selected to reduce the rate of flow of injection fluid through a downstream gate (34, 36) to a selected reduced rate of flow of injection fluid that is less than a maximum rate of flow.

In such a method the selected distal configuration (1041cs) and the selected control surface configuration of the control surface (1008) are preferably selected to control flow of injection fluid (18) through the gate (34, 36) at a selected rate of flow on driving the distal axial portion (1041d1) upstream at the single selected rate of upstream acceleration beginning from the gate closed, zero velocity position.

The selected rate of flow of injection fluid (18) is preferably less than a maximum rate at which the injection fluid (18) is injectable through the gate (34, 36). Such a maximum rate of flow typically occurs when the distal axial portion (1041d1) or the valve pin (1041) is withdrawn to either a maximum upstream axial position to which the valve pin (1041) can be withdrawn or to an end of stroke (EOS) position.

In such a method the valve pin (1041) or the distal axial portion (1041d1) can be further driven at a selected rate of downstream deceleration (906) beginning from a selected position (906o) upstream of the gate closed position (GC) to the gate closed (GC) position.

In such a method the valve pin (1041) or the distal axial portion (1041d1) can be further driven at a selected rate of downstream deceleration (920) beginning from a selected intermediate upstream position (920o) to an intermediate zero velocity position (912).

In such a method the valve pin (1041) or the distal axial portion (1041d1) can be further driven at a selected rate of upstream deceleration (914) beginning from a selected intermediate position (914o) upstream of the gate closed position (GC) to an intermediate zero velocity position (916).

In such a method the valve pin (1041) or the distal axial portion (1041d1) can be further driven at a selected rate of downstream acceleration (908) beginning from an end of stroke (EOS) position or from an intermediate upstream zero velocity position (912).

In such a method the valve pin (1041) or the distal axial portion (1041d1) can be further driven at a selected rate of downstream deceleration (920) beginning from a selected intermediate upstream position (920o) to an intermediate zero velocity position (912).

Such a method preferably includes forming a sloped or configured, conical, cylindrical, straight or curvilinear channel or restriction gap (CG, 1006rg) disposed upstream of the gate (34, 1000g, 3000gep) to the mold cavity (30, 3000) having a control surface (1008) adapted to operate in combination with the distal axial portion (1041d1) and the single selected rate of upstream acceleration (900) to control flow of injection fluid (18) through the gate (34, 36) at a controllably selectable rate of flow on driving the distal axial portion (1041d1) upstream at the single selected rate of upstream acceleration beginning from the gate closed, zero velocity position.

The controllably selectable rate of flow of injection fluid (18) through the gate (34, 36) is preferably less than a maximum rate at which the injection fluid (18) is injectable through the gate (34, 36).

Such a method can include one or both of forming the control surface (1008) into one or both of a configuration disposed at a selected angle (AG) relative to a linear axis (X) of travel of the valve pin (1041) and forming the control surface (1008) with a portion (1006dsp) having a smallest radial diameter (CD, 1006dsd) that is greater than a largest diameter (1041d1d) of the distal axial portion (1041d1) by a selected distance or both.

Such a method can include forming an upstream channel portion (1006us) of the downstream channel (1006) that has a conical or tapered or sloped surface (1009) disposed upstream relative to the downstream channel portion (1006ds) and is sloped or angled (UAG) relative to the linear axis (A) or circumferential surface (1041cs) of the valve pin (1041) by an angle (UAG) and extends along an axial length (UCT) of the downstream channel (1006) such that flow of injection fluid (18) flows without significant restriction through the upstream channel portion (1006us).

Such a method can include selecting the angle (AG) to be between about 3 degrees and about 6 degrees.

Such a method can include selecting the angle (UAG) to be greater than the angle (AG).

Such a method can include disposing the control surface (1008) along an axial length (CT) of a path of travel of the valve pin (1041) of between about 3 mm and about 6 mm.

Such a method can include forming the control surface (1008) to have a smallest radial diameter (CD) or a portion (1006dsp) having smallest radial diameter (CD, 1006dsd) that is greater than a largest radial diameter (1041md) of the distal axial portion (1041d1) o between about 0.1 mm and about 0.8 mm.

Such a method preferably includes extending from the downstream channel portion (1006ds) an interior surface (1010) that extends along a distal end portion (DS) of the downstream channel (1006) that is disposed immediately downstream of the control surface (1008) and adapting the interior surface (1010) to engage or mate with the exterior surface (1041cs) of the distal axial portion (1041d1) of the selected valve pin (1041) such that the selected gate (34, 100G) is closed when the selected valve pin (1041) is axially positioned or driven to a position where the distal axial portion (1041d1) is disposed within the distal end portion (DS) of the downstream channel portion (1006ds).

Such a method preferably includes forming an angle (AG) in the control surface (1008) relative to the linear axis (A) that is selected to create a restriction in flow of the injection fluid through the channel gap (CG) into the mold cavity (30, 1000) that enables a controllable acceleration or deceleration in rate of flow of injection fluid (18, 1153) through the gate (34, 36) relative to acceleration or deceleration that occurs where the downstream channel (1006ds) is straight or cylindrical by controllable positioning or driving of a distal axial portion (1041d1) of the selected valve pin (1041) along a path of travel within or through the channel gap (CG) beginning from a closed position downstream of the channel gap (CG) to a position upstream of the channel gap (CG) or beginning from a position upstream of the channel gap (CG) to a closed position downstream of the channel gap.

Such a method can include disposing or forming the conical or tapered or sloped or configured surface (1008) along or within a distal interior surface of an insert or extension (1003) disposed within a distal end of a main nozzle body (1004).

Such a method can include disposing or forming the control surface (1008) along or within a distal end interior surface of a main nozzle body (1004) or within a gate entry portion (3000gep) of the mold (3002).

Such a method can include controlling the rate of flow of injection fluid (18) through the channel gap (CG) to a selected rate of flow that is less than a maximum rate of flow by controllably driving a selected valve pin (1041, 1042) upstream at the single selected rate of upstream acceleration.

Such a method typically includes selecting the actuator (941, 942) to comprise an electric motor having an electrically driven rotor drivably interconnected to the valve pin in an arrangement that converts rotary motion of the rotor to linear motion of the valve pin (1041).

Such a method preferably includes disposing the gate (34, 36) of one or more of the valves downstream of an upstream gate (32) of an upstream valve through which the injection fluid is injected into the cavity (30, 300) at a first time, and driving the actuator (941, 942) interconnected to an associated valve pin (1041, 1042) to open the downstream disposed gate (34, 36) at a second time following the first time such that the injection fluid (18) injected through the gate (34, 36) is injected into a stream of injection fluid injected through the upstream gate (32) and has traveled downstream through the cavity (30, 300) past the gate (34, 36).

Such a method can include driving the valve pin (1041, 1042) at the single selected rate of upstream acceleration (900) up to the selected upstream velocity (902) over a path of travel of between about 1 mm and about 5 mm.

In such a method the valve pin (1041, 1042) is typically driven at a selected upstream velocity that is less than about 75% of a maximum velocity at which the valve pin is drivable.

In another aspect of the invention there is provided an injection molding apparatus (10) comprising an injection molding machine (13) that injects a flow of injection fluid (18) to a heated manifold (40) that distributes the injection fluid (18) to a distribution channel that delivers the injection fluid to a gate (34, 36, 1000g, 3000gep) of a mold cavity (30, 3000) via one or more valves each comprised of an actuator (941, 942) interconnected to a valve pin (1041, 1042) having a linear axis (X) of travel, the apparatus further comprising a controller (16) interconnected to the actuator (941, 942) that includes instructions that instruct the actuator (941, 942) to drive an interconnected valve pin (1041, 1042) having a distal axial portion (1041d1) having a selected distal configuration (1041cs) upstream and downstream through a downstream channel (1006) that has a downstream channel portion (1006ds) that has a control surface (1008) having a selected control surface configuration, wherein the selected distal configuration (1041cs) of the valve pin (1041, 1042) and the selected control surface configuration of the control surface (1008) are configured to interact with each other along a select path of upstream travel (1006*dsl*) of the valve pin beginning from a gate closed position (GC) to restrict rate of flow of the injection fluid (18) through the gate (34, 36) to less than a maximum rate of flow, the controller including instructions that instruct the actuator (941, 942) to drive the distal axial portion (1041*d*1) of the valve pin (1041, 1042) beginning from the gate closed, zero velocity position (GC) at a single selected rate of upstream acceleration (900) through the select path of upstream travel (1006*dsl*).

In another aspect of the invention there is provided a method of performing an injection molding cycle in an injection molding apparatus (10) comprising an injection molding machine (13) that injects a flow of injection fluid (18) to a heated manifold (40) that distributes the injection fluid (18) to a distribution channel that delivers the injection fluid to a gate (34, 36, 1000*g*, 3000*gep*) of a mold cavity (30, 3000) via one or more valves each comprised of an actuator (941, 942) interconnected to a valve pin (1041, 1042) having a linear axis (X) of travel, the method comprising:

controlling the actuator (941, 942) to drive an interconnected valve pin (1041, 1042) having a distal axial portion (1041*d*1) having a selected distal configuration (1041*cs*) upstream and downstream through a downstream channel (1006) that has a downstream channel portion (1006*ds*) that has a control surface (1008) having a selected control surface configuration, configuring the selected distal configuration (1041*cs*) of the valve pin (1041, 1042) and the selected control surface configuration of the control surface (1008) to interact with each other along a select path of upstream travel (1006*dsl*) of the valve pin beginning from a gate closed position (GC) to restrict rate of flow of the injection fluid (18) through the gate (34, 36) to less than a maximum rate of flow, controllably driving the actuator (941, 942) to drive the distal axial portion (1041*d*1) at one or more of:

(a) a selected rate of downstream deceleration (906) beginning from a selected position (906*o*) upstream of the gate closed position (GC) to the gate closed (GC) position, (b) a selected rate of downstream deceleration (920) beginning from a selected intermediate upstream position (920*o*) to an intermediate zero velocity position (912), (c) a selected rate of upstream deceleration (914) beginning from a selected intermediate position (914*o*) upstream of the gate closed position (GC) to an intermediate zero velocity position (916), (d) a selected rate of downstream acceleration (908) beginning from an end of stroke (EOS) position or from an intermediate upstream zero velocity position (912), In such a method, the selected rate of downstream deceleration (906, 920), upstream deceleration (914) and downstream acceleration (908) is typically selected to control flow of injection fluid (18) through the gate (34, 36) at or to a selected rate of flow of injection fluid (18).

In another aspect of the invention there is provided an injection molding apparatus (10) comprising an injection molding machine (13) that injects a flow of injection fluid (18) to a heated manifold (40) that distributes the injection fluid (18) to a distribution channel that delivers the injection fluid to a gate (34, 36, 1000*g*, 3000*gep*) of a mold cavity (30, 3000) via one or more valves each comprised of an actuator (941, 942) interconnected to a valve pin (1041, 1042) having a linear axis (X) of travel, the apparatus further comprising a controller (16) interconnected to the actuator (941, 942) that includes instructions that instruct the actuator (941, 942) to drive an interconnected valve pin (1041, 1042) having a distal axial portion (1041*d*1) having a selected distal configuration (1041*cs*) upstream and downstream through a downstream channel (1006) that has a downstream channel portion (1006*ds*) that has a control surface (1008) having a selected control surface configuration, wherein the selected distal configuration (1041*cs*) of the valve pin (1041, 1042) and the selected control surface configuration of the control surface (1008) are configured to interact with each other along a select path of upstream travel (1006*dsl*) of the valve pin beginning from a gate closed position (GC) to restrict rate of flow of the injection fluid (18) through the gate (34, 36) to less than a maximum rate of flow, the controller including instructions that instruct the actuator (941, 942) to drive the distal axial portion (1041*d*1) at one or more of:

(a) a selected rate of downstream deceleration (906) beginning from a selected position (906*o*) upstream of the gate closed position (GC) to the gate closed (GC) position, (b) a selected rate of downstream deceleration (920) beginning from a selected intermediate upstream position (920*o*) to an intermediate zero velocity position (912), (c) a selected rate of upstream deceleration (914) beginning from a selected intermediate position (914*o*) upstream of the gate closed position (GC) to an intermediate zero velocity position (916), (d) a selected rate of downstream acceleration (908) beginning from an end of stroke (EOS) position or from an intermediate upstream zero velocity position (912), (e) a selected rate of downstream deceleration (920) beginning from a selected intermediate upstream position (920*o*) to an intermediate zero velocity position (912).

DETAILED DESCRIPTION OF THE INVENTION

Figure 1:
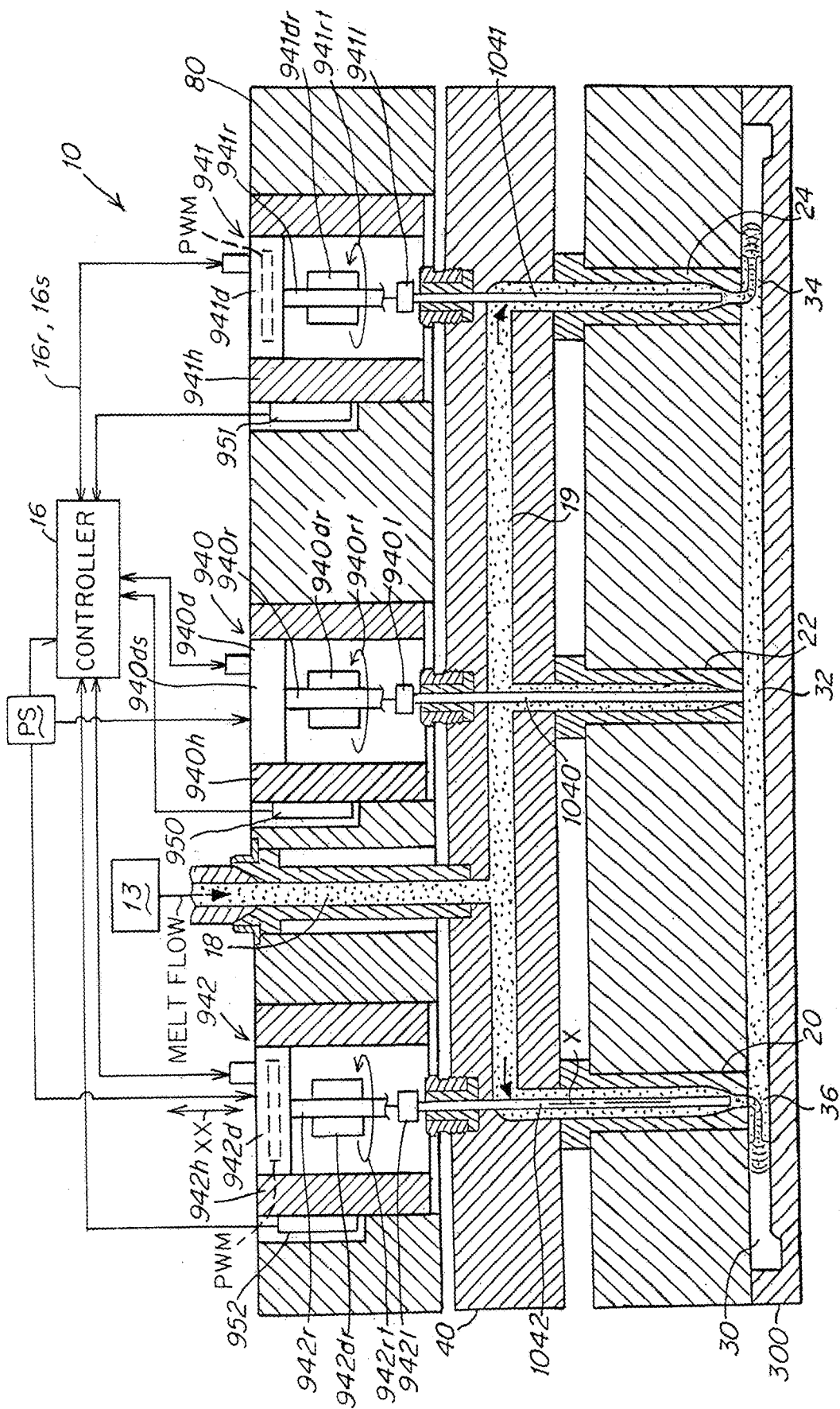
FIG. 1 is a schematic side sectional view of an injection molding apparatus according to the invention.
Figure 1A:
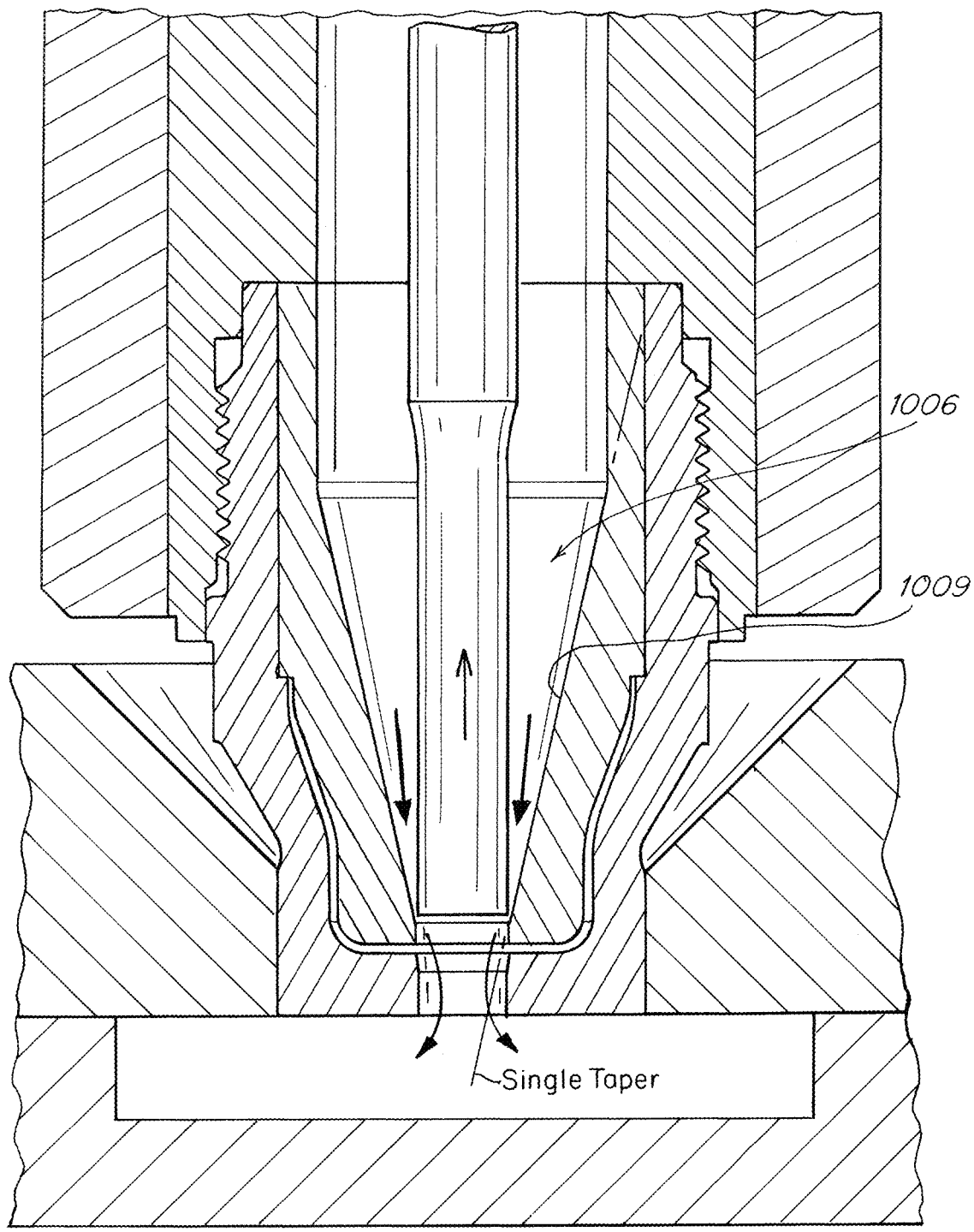
FIG. 1A is a side schematic sectional view of a known valve with a downstream wide tapered flow channel and cylindrical valve pin configuration.

FIG. 1 shows an injection molding apparatus 10 having a center valve 32 with associated actuator (940) and two downstream valves 34, 36 with associated actuators (941, 942) that are opened to a mold cavity 30 in a predetermined sequence after the center valve is first opened, the actuators (940, 941, 942) each comprising an electric motor having an electric drive (940*d*, 941*d*, 942*d*). The electric drive (940*d*, 941*d*, 942*d*) can be housed within the same housing (940*h*, 941*h*, 942*h*) as the driver components of the electric actuator (940, 941, 941), or the electric drive (940*d*, 941*d*, 942*d*) can be housed within a physically separate thermally conductive housing (941*ds*).

The electric drive (940*d*, 941*d*, 942*d*) is preferably mounted on or to the actuator housing (940*h*, 941*h*, 942*h*) in some manner such that the drive components such as a Pulse Width Modulator (PWM) and associated electrical components are disposed in substantial heat communication or contact with the actuator housing (940*h*, 941*h*, 942*h*) or the heated manifold (40).

As shown in FIG. 1 the injection cycle is a cascade process where injection is effected in a sequence from the center nozzle 22 and gate 32 first and at a later predetermined time from the lateral nozzles 20, 24 and gates 34, 36 typically after the injection fluid 18 has flowed downstream from the center gate 32 past the downstream gates 34, 36. The injection cycle is typically started by first opening the pin 1040 of the center nozzle 22 and allowing the fluid material 18, 100 (typically polymer or plastic material) to flow up to a position 100*a* in the cavity just before 100*b* the distally disposed entrance into the cavity 34, 36 of the gates of the lateral nozzles 24, 20 as shown in FIG. 1. After an injection cycle is begun, the gate of the center injection nozzle 22 and pin 1040 is typically left open only for so long as to allow the fluid material 100*b* to travel to a position 100*p* just past the positions 34, 36. Once the fluid material has travelled just past 100*p* of the lateral gate positions 34, 36, the center gate 32 of the center nozzle 22 is typically closed by pin 1040. The lateral gates 34, 36 are then opened by upstream withdrawal of lateral nozzle pins 1041, 1042. As described below, the rate of acceleration or upstream withdrawal or travel velocity of lateral pins 1041, 1042 can be controlled to minimize potential problems with the filling of the mold cavity.

In alternative embodiments, the center gate 32 and associated actuator 940 and valve pin 1040 can remain open at, during and subsequent to the times that the lateral gates 34, 36 are opened such that fluid material flows into cavity 30, 3000 through both the center gate 32 and one or both of the lateral gates 34, 36 simultaneously.

The rate of acceleration 900, 918, 908 or deceleration 904, 906, 920 of pins 1041, 1042 starting from any axial position is controlled via controller 16 which controls the rate and direction of drive of the electric actuators 940, 941, 942.

The single selected rate of upstream acceleration (900) is typically selected to reduce the rate of flow of injection fluid through a downstream gate (34, 36) to a selected reduced rate of flow that minimizes a reduction in injection fluid flow through an upstream gate (32) that is opened at a first time prior to a delayed second time during an injection cycle when a downstream gate (34, 36) is opened in a sequential or cascade process. The single selected rate of upstream acceleration (900) beginning from a gate closed (GC) position is typically selected to reduce the rate of flow of injection fluid through a downstream gate (34, 36) to a selected reduced rate that is less than a maximum rate of flow at which the injection fluid (18) flows at an end of stroke (EOS) position.

The user programs controller 16 via data inputs on a user interface to instruct the electric actuators to drive pins 1041, 1042 at an upstream or downstream rate of acceleration from zero to a selected velocity of travel that is selected to minimize potential problems with filing of the mold cavity.

FIG. 1 shows position sensors 950, 951, 952 for sensing the position of the motors 940, 941, 942 and their associated valve pins (such as 1040, 1041, 1042) and feed such position information to controller 16 for monitoring purposes. As shown, fluid material 18 is injected from an injection machine into a manifold runner 19 and further downstream into the bores 44, 46 of the lateral nozzles 24, 22 and ultimately downstream through the gates 32, 34, 36.

When the pins 1041, 1042 are first withdrawn upstream beginning in a gate closed GC zero velocity position as shown for example in FIGS. 3, 50, 6A, 6B, 6C the pins are withdrawn at a single selected rate of acceleration 900 beginning from zero velocity to a selected constant upstream velocity 902 that is greater than zero and is typically less than a maximum velocity at which actuator is capable of driving the valve pin 1041, 1042. Similarly, when the pins 1041, 1042 have been withdrawn upstream close to a fully upstream end of stroke (EOS) position, the pins can be controllably decelerated at a single selected rate of deceleration 904 typically to zero velocity. Similarly again, the pins 1041, 1042 can be driven at a single rate of downstream directed acceleration 908 beginning from the end of stroke position (EOS) toward a selected downstream directed constant velocity 910. Similarly again, when the pins 1041, 1042 approach a fully downstream gate closed position, the pins 1041, 1042 can be decelerated at a selected rate of deceleration 906 to zero velocity at which the pins have typically reached the gate closed position GC.

The rate of flow of injection fluid through the downstream channel portion (1006*ds*) and the gate (34, 36) is typically at a maximum rate for any given injection cycle when the valve pin is disposed in the end of stroke (EOS) position. And, the rate of flow of injection flow is at reduced rate less than the maximum rate when the distal end of the valve pin (1041*d*1) is disposed within the downstream channel portion (1006*ds*). The end of stroke position (EOS) may not necessarily be the furthest upstream position to the which valve pin can be withdrawn. It is possible that the rate of flow of injection fluid could be even higher when the valve pin is withdrawn to a position further upstream than the end of stroke position (EOS). However, where an end of stroke position (EOS) is selected that is downstream of the furthest upstream position to which the valve pin can be withdrawn, the rate of flow of injection fluid will be at a maximum rate for any given injection cycle when the valve pin reaches the end of stroke position (EOS) selected for the given injection cycle even though the valve pin could be withdrawn even further upstream to a maximum upstream position where the rate of injection fluid flow could be at an absolute maximum even higher than the rate of flow when the valve pin is in the end of stroke position. It is also possible that the absolute maximum rate of injection fluid flow is achieved when the valve pin is disposed in the end of stroke (EOS) position even though the valve pin is not disposed in the absolute furthest upstream position to which it could be withdrawn.

It is also possible that the end of stroke (EOS) position could be selected to be the absolute furthest upstream position to which the valve pin could be withdrawn. But not necessarily.

Figure 6A:
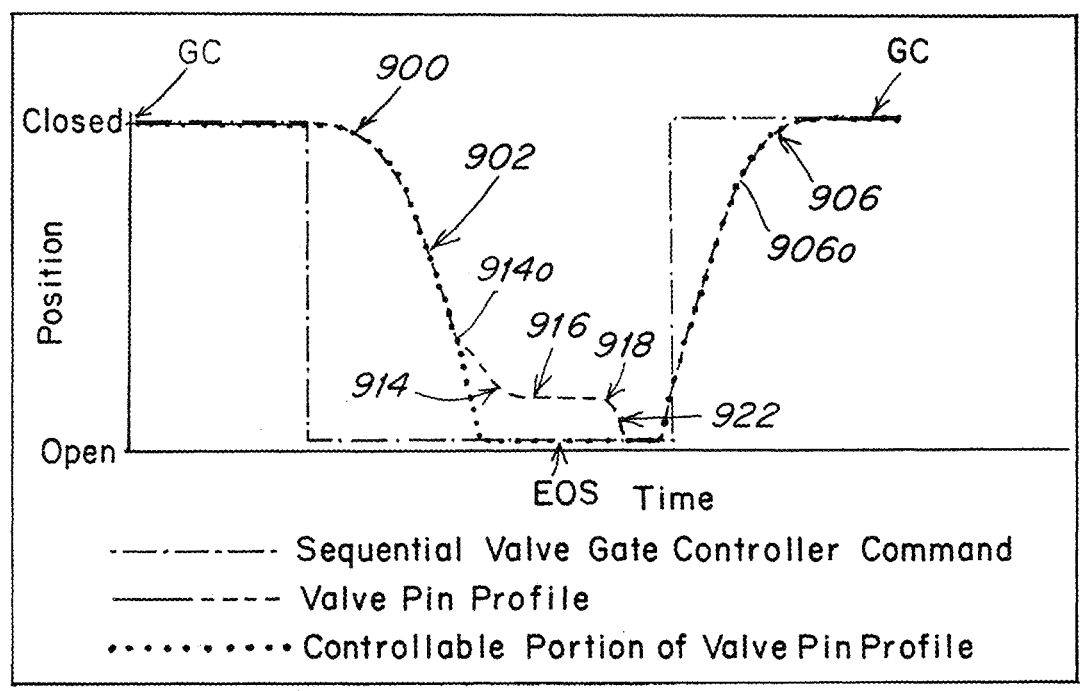
FIG. 6A is a plot of valve pin position versus time during an injection cycle using a valve configuration according the invention where the valve pin is controllably accelerated on opening and decelerated on approaching the end of stroke position.

Movement of the pins 1041, 1042 can be further controlled to decelerate the pins at a selected rate of deceleration 914 to a zero velocity position 916 that is downstream of the end of stroke EOS position such that the pins 1041, 1042 remain in a selected intermediate, zero velocity position 916 between gate closed GC and end of stroke EOS for a selected period of time, FIG. 6A. The pins 1041, 1042 can then be again accelerated 918 upstream to an upstream velocity 922. After having been accelerated 918 to the upstream velocity 922, the valve pins 1041, 1042 can then again be decelerated 918 to terminate in the end of stroke EOS upstream position.

As shown in FIGS. 2, 2A, 2B, 3, 4, 5, 5A, 5B, 5C, a downstream valve disposed downstream of an upstream center or main valve is comprised of an actuator (941, 942) interconnected to a valve pin (1041, 1042) having a linear axis (X) of travel in an arrangement wherein the actuator (941, 942) is adapted to controllably drive an interconnected valve pin (1041, 1042) upstream and downstream through a downstream channel (1006) that has a downstream channel portion (1006*ds*) that has a control surface (1008). The control surface (1008) can be sloped, conical, cylindrical, straight or curvilinear and forms a channel or restriction gap (CG, 1006*rg*). The size or configuration of the channel or restriction gap is pre selected in combination with a single selected rate of acceleration of the pin 1041, 1042 beginning from the gate closed position up to a predetermined constant velocity that is preferably less than a maximum velocity at which the actuator is capable of driving the pin 1041, 1042. The channel or restriction gap CG, 1006*rg* is disposed immediately upstream of the gate 34, 1000*g*, 3000*gep* to the mold cavity 30, 3000.

As shown in FIGS. 2, 2A, 2B, 3, 4, 5, 5A, 5B, 5C, the valve pin (1041) has a distal axial portion (1041*d*1) that is controllably drivable upstream and downstream via a controller 16 interconnected to the actuator 941, 942. The controller 16 includes a program that contains instructions that instruct the actuator 941, 942 to drive the valve pin 1041, 1042 through the channel or restriction gap (CG, 1006*rg*) and more particularly to controllably drive a distal axial portion (1041*d*1) of the valve pin 1041, 1042 beginning from a gate closed, zero velocity position at a single selected rate of upstream acceleration up to a selected reduced upstream velocity that is less than a maximum velocity at which the valve pin (1041) is drivable by the actuator 941.

The size or configuration of the channel or restriction gap (CG, 1006*rg*) and the single selected rate of upstream acceleration are selected in combination with each other to control flow of injection fluid (18) through the channel gap (CG, 1006*rg*) at a selected rate of flow on driving the distal axial portion (1041*d*1) upstream at the single selected rate of upstream acceleration beginning from the gate closed, zero velocity position to the selected upstream velocity that is greater than zero and less than a maximum.

As shown in FIGS. 2, 2A, 2B, 3, 4, 5, 5A, 5B, 5C, the size or volume of the channel or restricted gap (CG, 1006*rg*) is selected by selecting one or the other or both of an angle (AG) between the control surface (1008) and the linear axis (X) of travel of the valve pin (1041) and optionally also by further selecting a smallest diameter (CD, 1006*dsd*) of the control surface (1008) or a portion (1006*dsp*) of the control surface that has a smallest radial diameter that is greater than a largest diameter (1041*d*1*d*) of the distal axial portion (1041*d*1) by a selected distance.

In the embodiments shown in FIGS. 2, 2A, 2B, 3, 4, 5, 5A, 5B, 5C, the downstream channel (1006) preferably includes an upstream channel portion (1006*us*) that has a conical or tapered or sloped surface (1009) disposed upstream relative to the downstream channel portion (1006*ds*) and is sloped or angled (UAG) relative to the linear axis (A) or circumferential surface (1041*cs*) of the valve pin (1041) by an angle (UAG). As shown, the upstream channel portion extends along an axial length (UCT) of the downstream channel (1006) such that flow of injection fluid (18) flows without significant restriction through the upstream channel portion (1006*us*).

In the embodiments shown, the control surface (1008) is conical or sloped and has a slope or angle (AG) relative to the linear axis (A) or circumferential surface (1041*cs*) of the valve pin (1041) of between about 3 degrees and about 6 degrees. The angle (UAG) is greater than the angle (AG).

Preferably the control surface (1008) is conical or sloped and disposed along an axial length (CT) of between about 3 mm and about 6 mm.

The control surface (1008) typically has a smallest radial diameter (CD, 1006*dsd*) or a portion (1006*dsp*) that has a smallest radial diameter that is greater than a largest radial diameter (1041*md*) of the distal axial portion (1041*d*1) by between about 0.1 mm and about 0.8 mm.

As shown, the downstream channel portion (1006*ds*) has an interior surface (1010) extending along a distal end portion (DS) of the downstream channel (1006) that is disposed immediately downstream of the control surface (1008) and is adapted to engage or mate with the exterior surface (1041*cs*) of the distal axial portion (1041*d*1) of the selected valve pin (1041) such that the selected gate (34, 100G) is closed when the selected valve pin (1041) is axially positioned or driven to a position where the distal axial portion (1041*d*1) is disposed within the distal end portion (DS) of the downstream channel portion (1006*ds*).

The conical or tapered or sloped surface (1008) is selectively sloped or angled relative to the linear axis (A) by an angle (AG) selected to create a restriction in flow of the injection fluid through the channel gap (CG) into the mold cavity (30, 1000). The restriction in flow of injection enables a controllable acceleration or deceleration in rate of flow of injection fluid (1153) through the gate relative to acceleration or deceleration that occurs where the channel surface is straight or cylindrical by controllable positioning or driving of a distal axial portion (1041*d*1) of the selected valve pin (1041) along a path of travel within or through the channel gap (CG) beginning from a closed position downstream of the channel gap (CG) to a position upstream of the channel gap (CG) or beginning from a position upstream of the channel gap (CG) to a closed position downstream of the channel gap.

As shown in FIGS. 2, 2A, 3, 4, 5, 5A, 5B, 5C the control surface (1008) is typically disposed along or within a distal interior surface of an insert or extension (1003) disposed within a distal end of a main nozzle body (1000, 1004).

Figure 2:
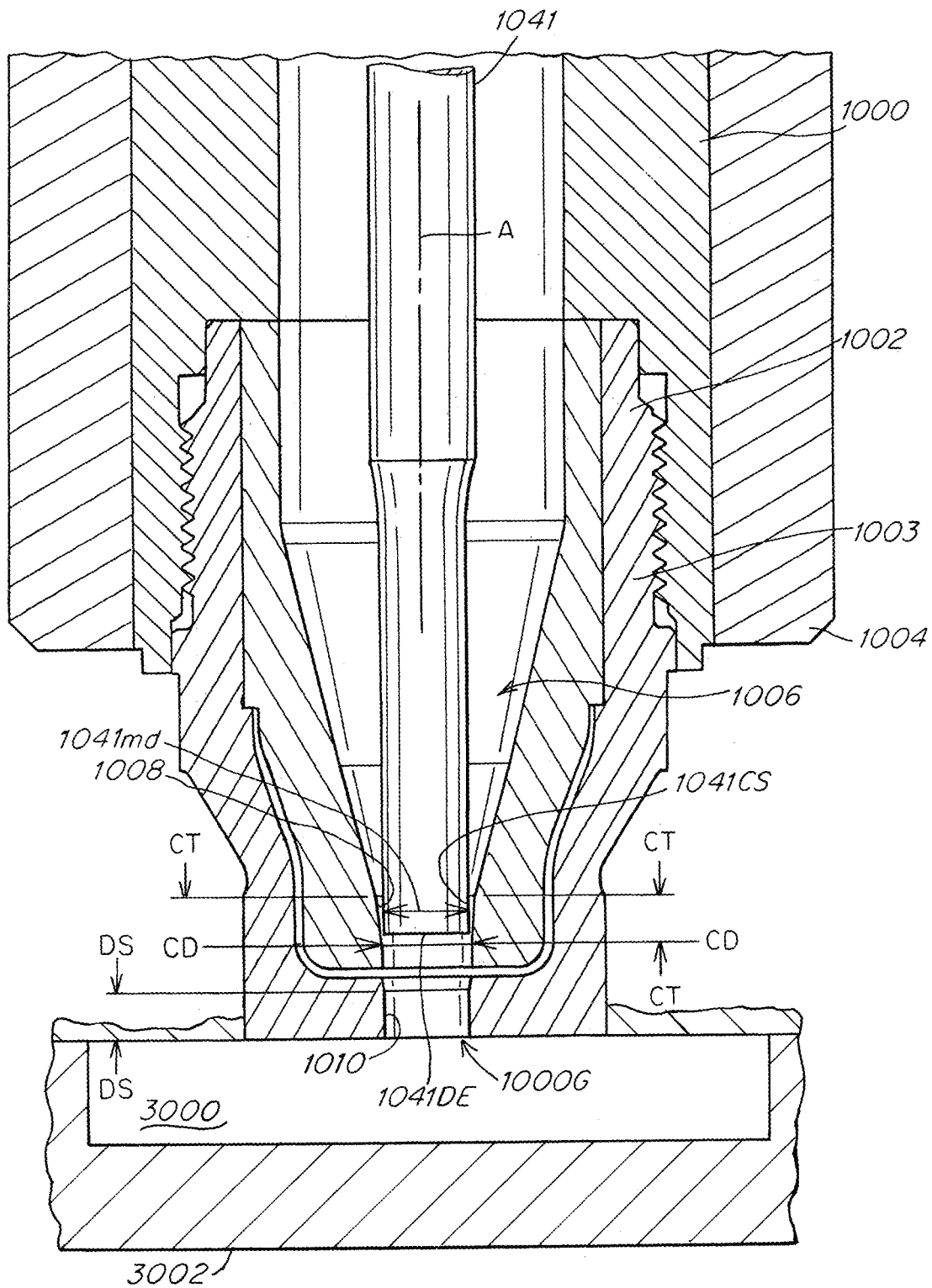
FIG. 2 is a side schematic sectional view of one embodiment of a valve configuration for use in the present invention.
Figure 2A:
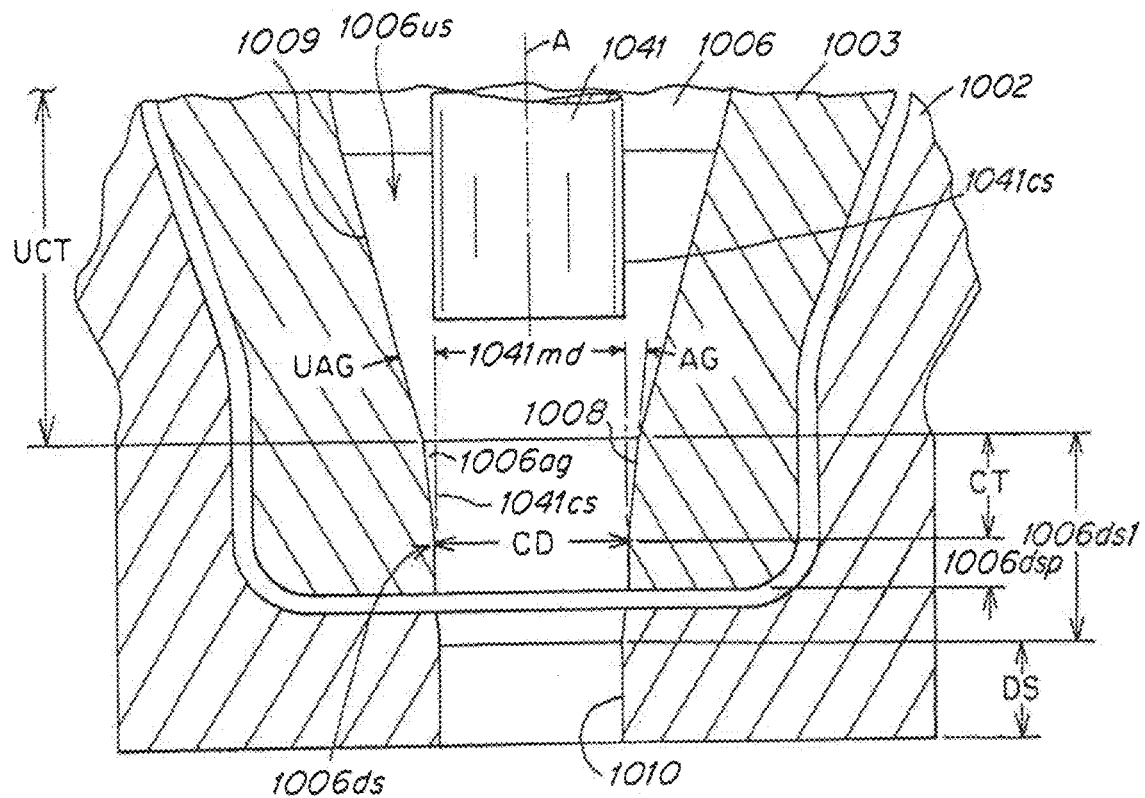
FIG. 2A is an enlarged view of the downstream end of the FIG. 3 valve.
Figure 2B:
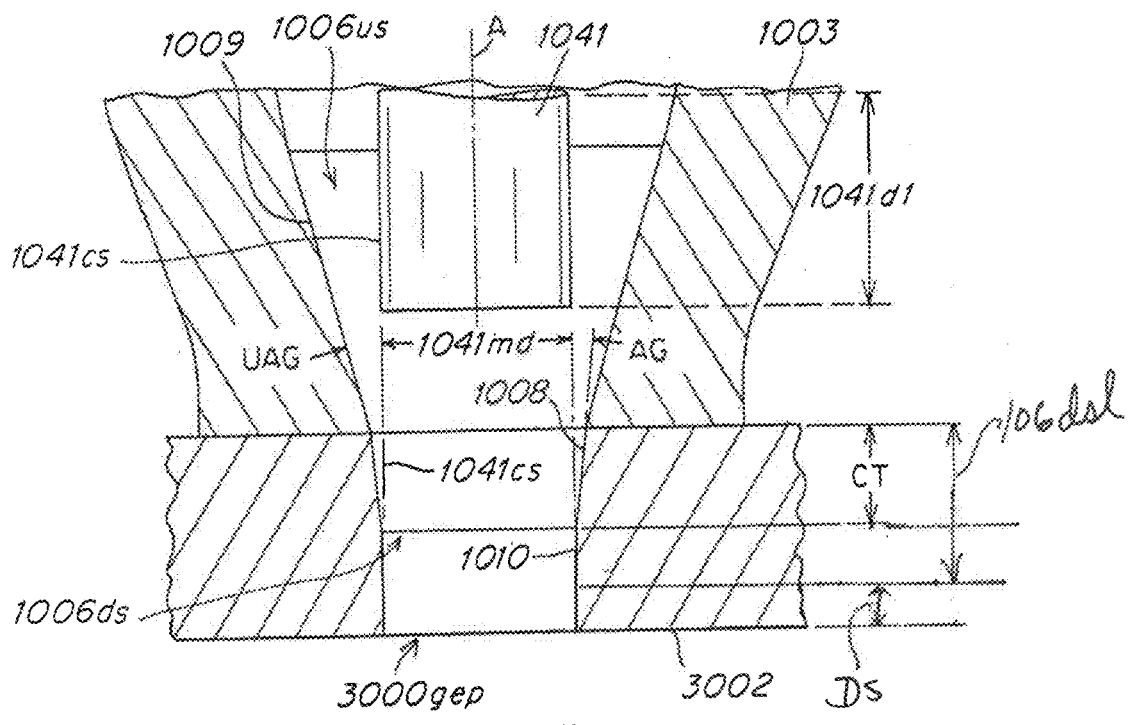
FIG. 2B is an enlarged view similar to FIG. 2A showing a downstream end with the gate disposed in the body of the mold plate.
Figure 3:
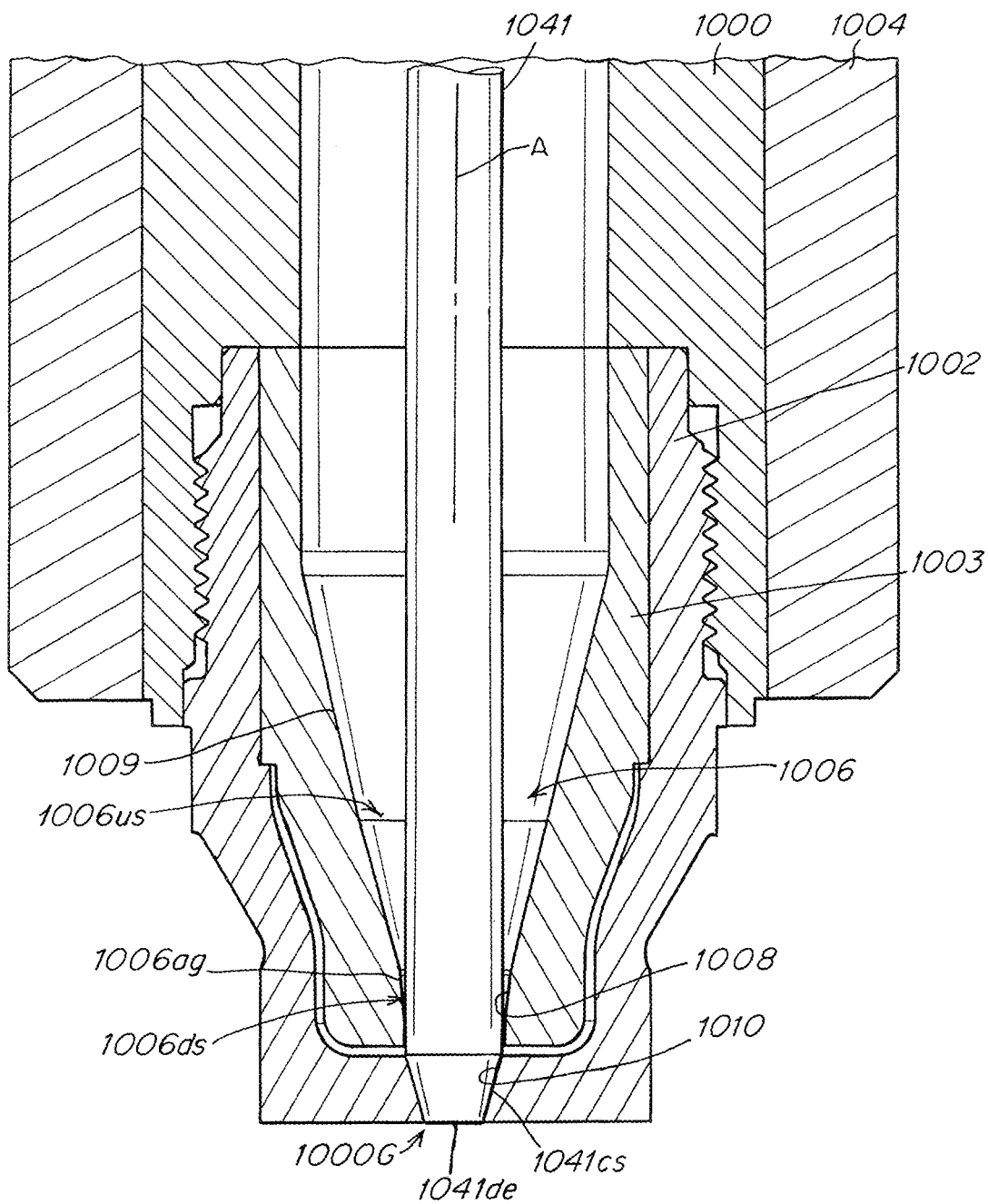
FIG. 3 is a side schematic sectional view of another embodiment of a valve configuration for use in the present invention showing the valve pin in a gate closed position.
Figure 4:
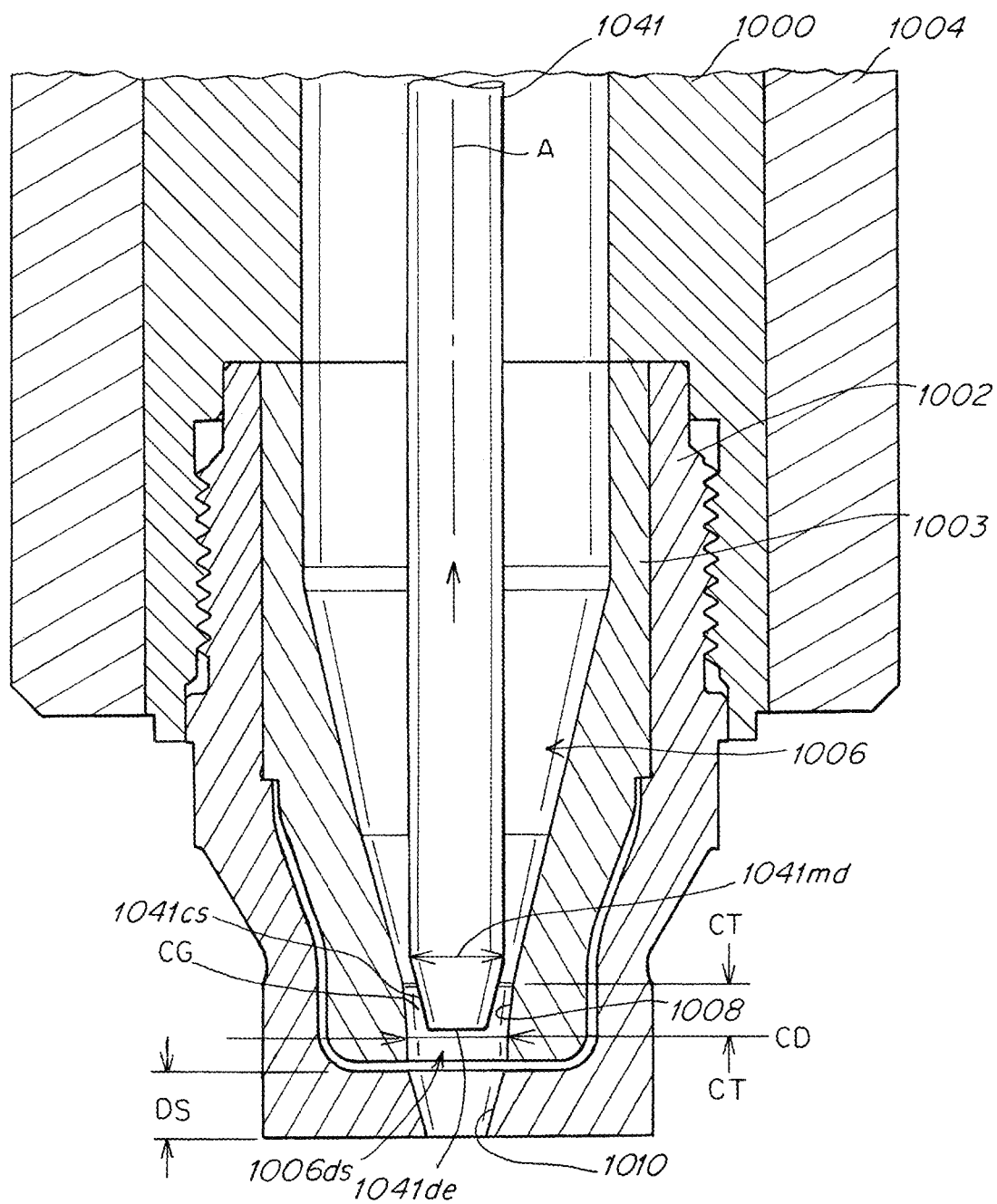
FIG. 4 is a view of the FIG. 3 valve showing the valve pin in an upstream partially gate open position.
Figure 5:
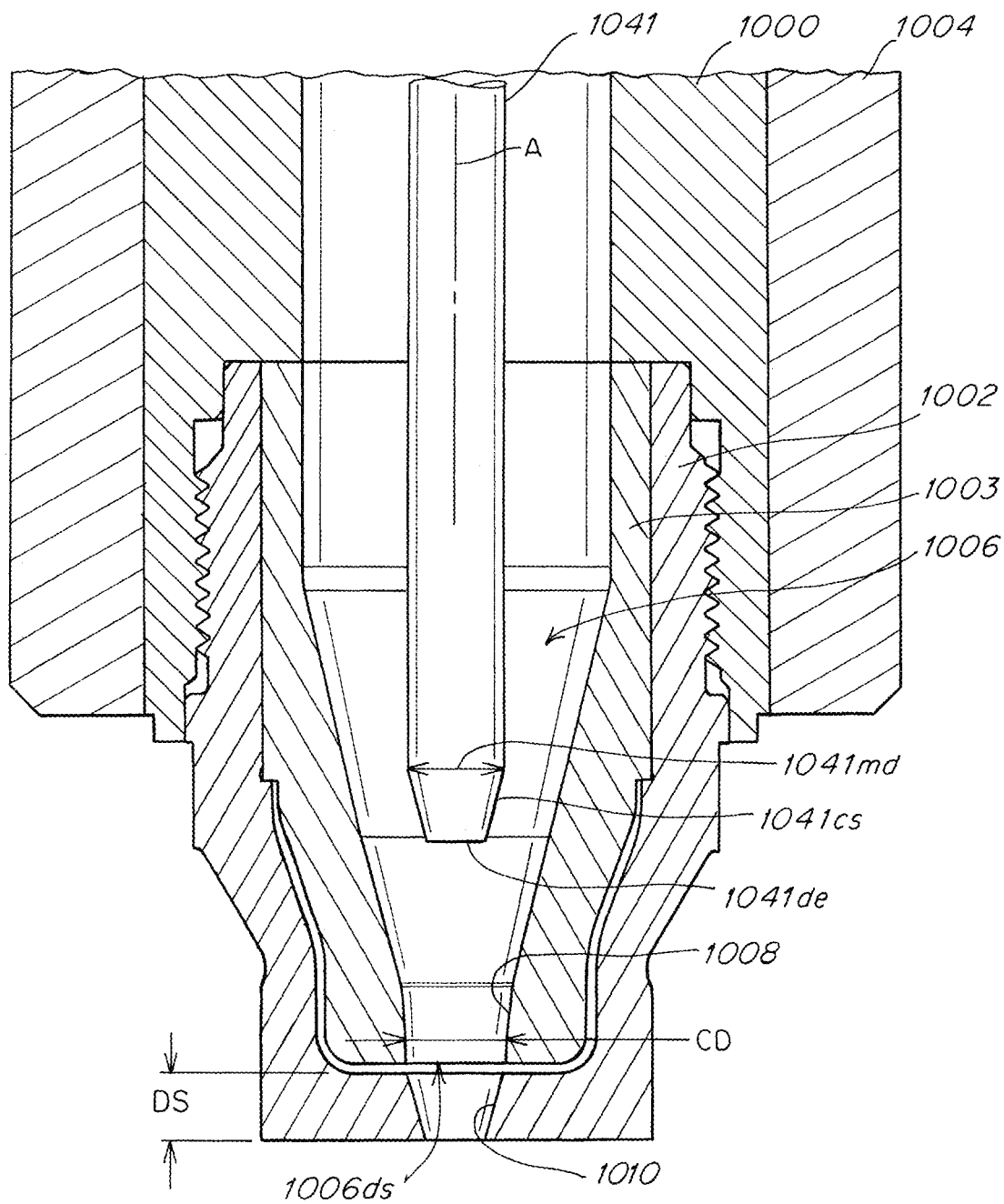
FIG. 5 is a view of the FIG. 3 valve showing the valve pin in a fully upstream full gate open and end of stroke position (EOS).
Figure 5A:
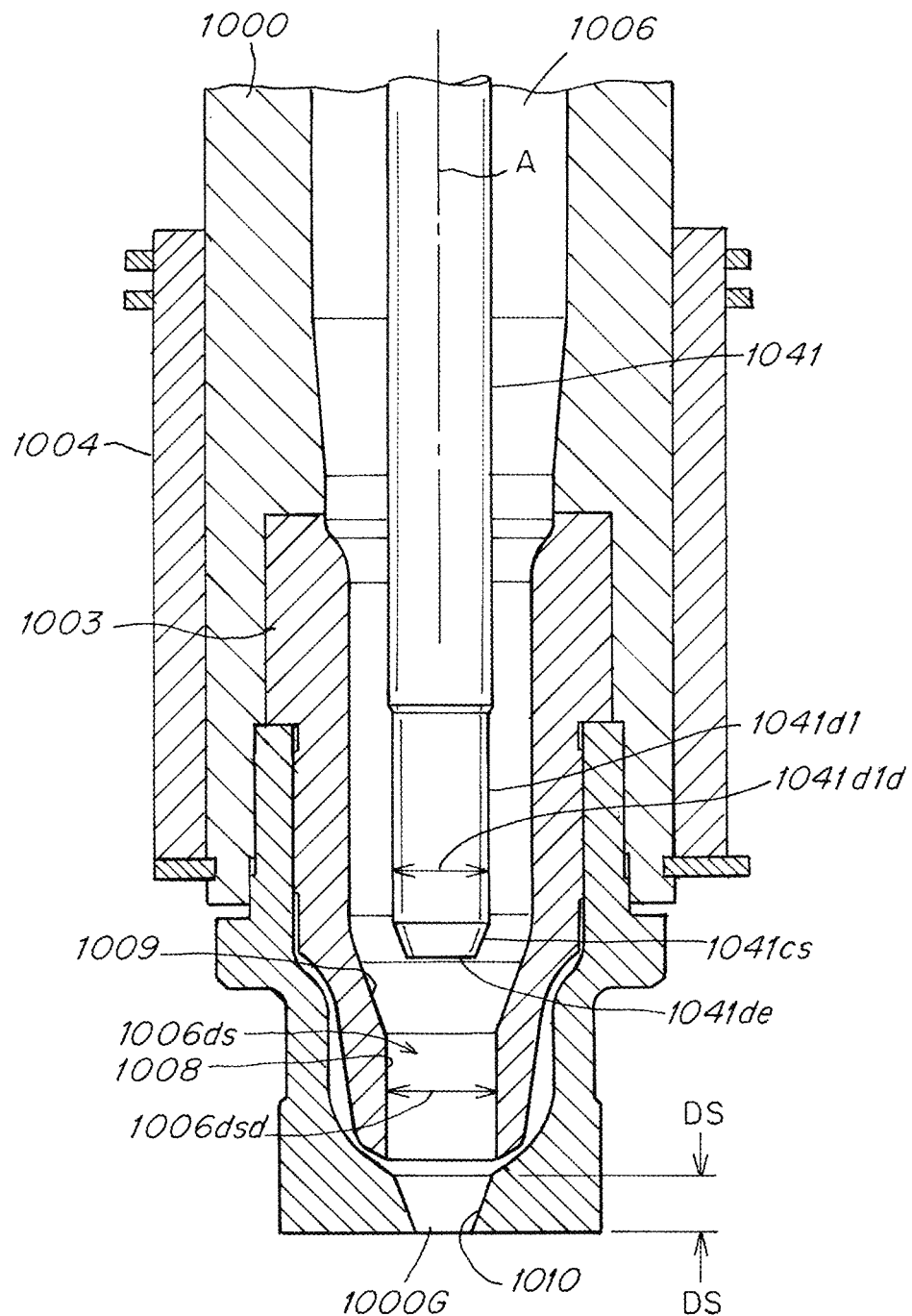
FIG. 5A is a side sectional view of another embodiment of a valve configuration for use in the present invention showing the valve pin in a fully upstream full gate open and end of stroke position (EOS).
Figure 5B:
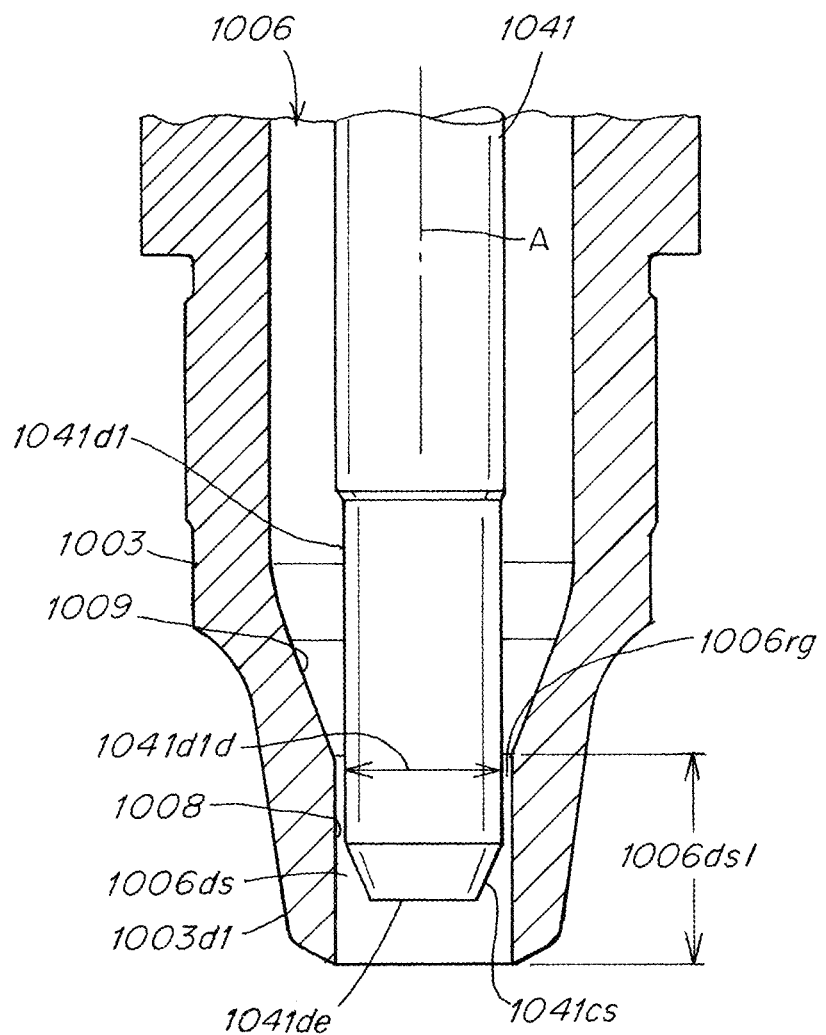
FIG. 5B is a view of the FIG. 5A valve showing the valve pin in an upstream partially gate open position.
Figure 5C:
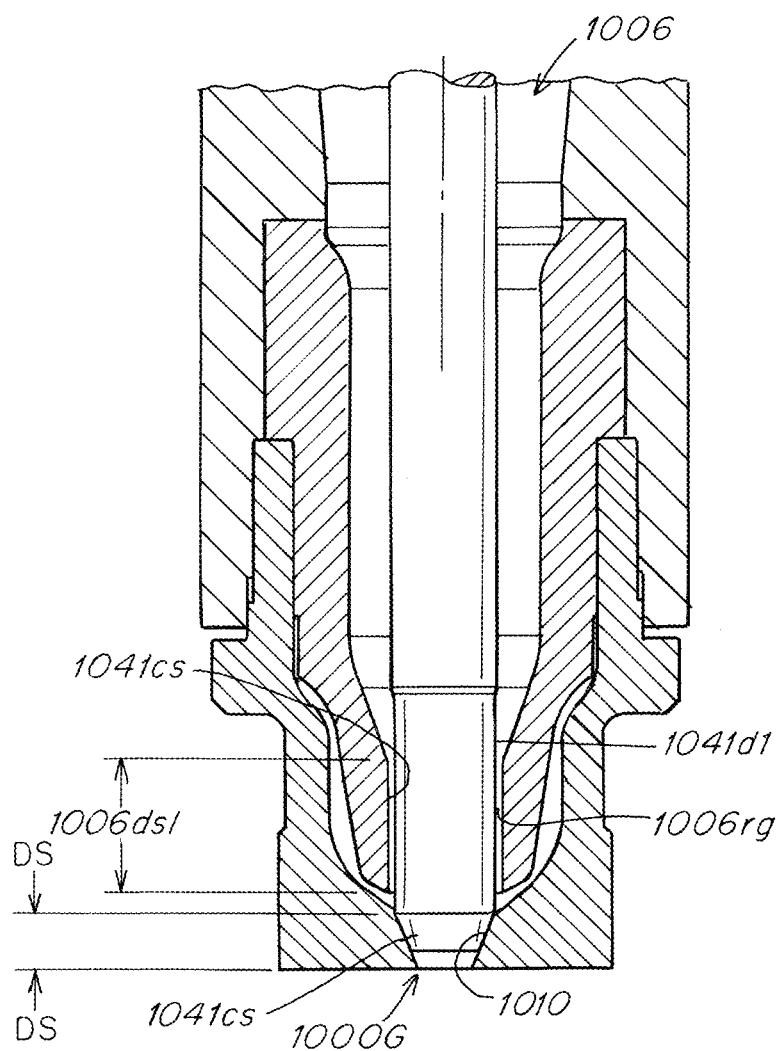
FIG. 5C is a view of the FIG. 5A valve showing the valve pin in a fully gate closed position.

As shown in FIG. 2B the conical or tapered or sloped surface (1008) can be disposed or formed along or within a distal end interior surface of a main nozzle body (1000, 1004) or disposed or formed within a gate entry portion (3000*gep*) of the mold itself (3002).

The rate of flow of injection fluid (18) through the channel gap (CG, 1006*rg*) is controllable to a selected rate of flow that is less than a maximum rate of flow by controllably driving the selected valve pin upstream at the single selected rate of upstream acceleration.

The actuator (1041, 1042) can comprise an electric motor having an electrically driven rotor drivably interconnected to the valve pin in an arrangement that converts rotary motion of the rotor to linear motion of the valve pin (1041).

In a preferred embodiment, the gate (34, 36) through which fluid is injected by controlled upstream acceleration of a valve pin 1041, 1042 is disposed downstream of a main or center upstream gate 32 of an upstream valve through which the injection fluid is first injected into the cavity (30, 300) at a first time. The actuator (941, 942) driving the downstream valve pin (1041, 1042) drives the valve pin 1041, 1042 upstream at the controlled single rate of acceleration to open the gate (34, 36) at a second time subsequent to or following the first time such that the injection fluid 18 is injected through the downstream gate (34, 36) after the stream of injection fluid 18 previously injected through the upstream gate 32 has traveled downstream past the downstream gate (34, 36).

The controller 16 is typically provided with instructions that instruct the valve pin to be driven at the single selected rate of upstream acceleration up to the selected reduced upstream velocity over a path of travel of between about 1 mm and about 5 mm.

The controller 16 is typically provided with instructions that instruct the valve pin to be driven at the selected reduced upstream velocity at preferably less than about 75% of the maximum velocity at which the actuator 941, 942 is capable of driving the valve pin.

Figure 6B:
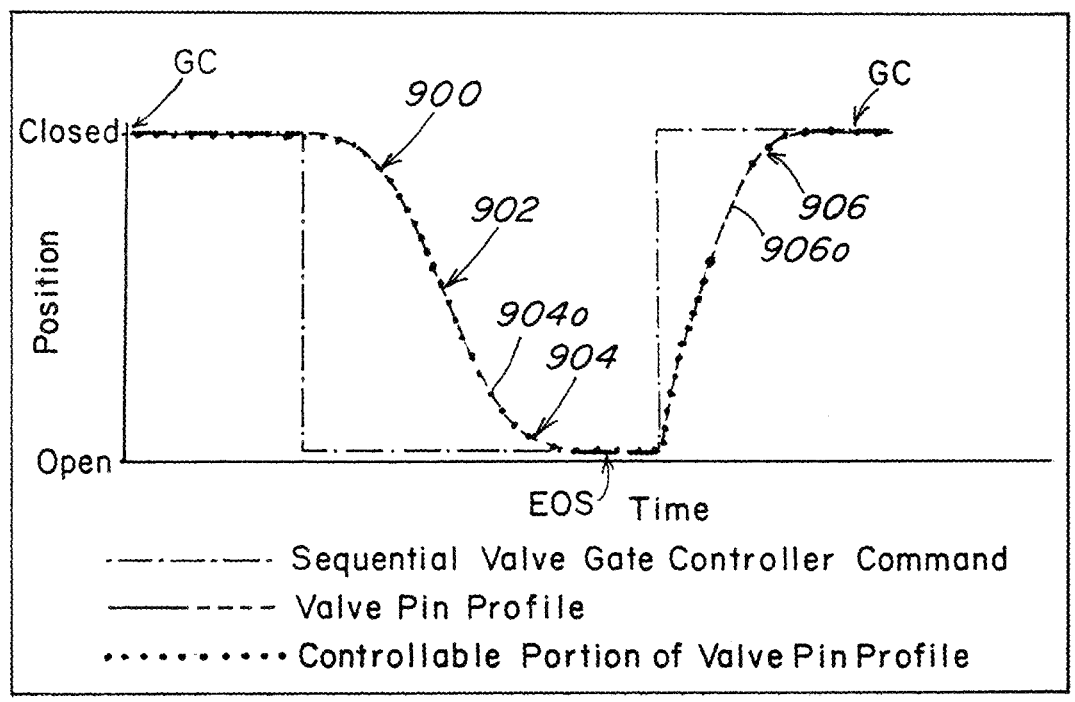
FIG. 6B is a plot of valve pin position versus time during an injection cycle using a valve according the invention where the valve pin is controllably accelerated on opening and decelerated and then accelerated on reaching the end of stroke position and then decelerated on approaching the gate closed position.
Figure 6C:
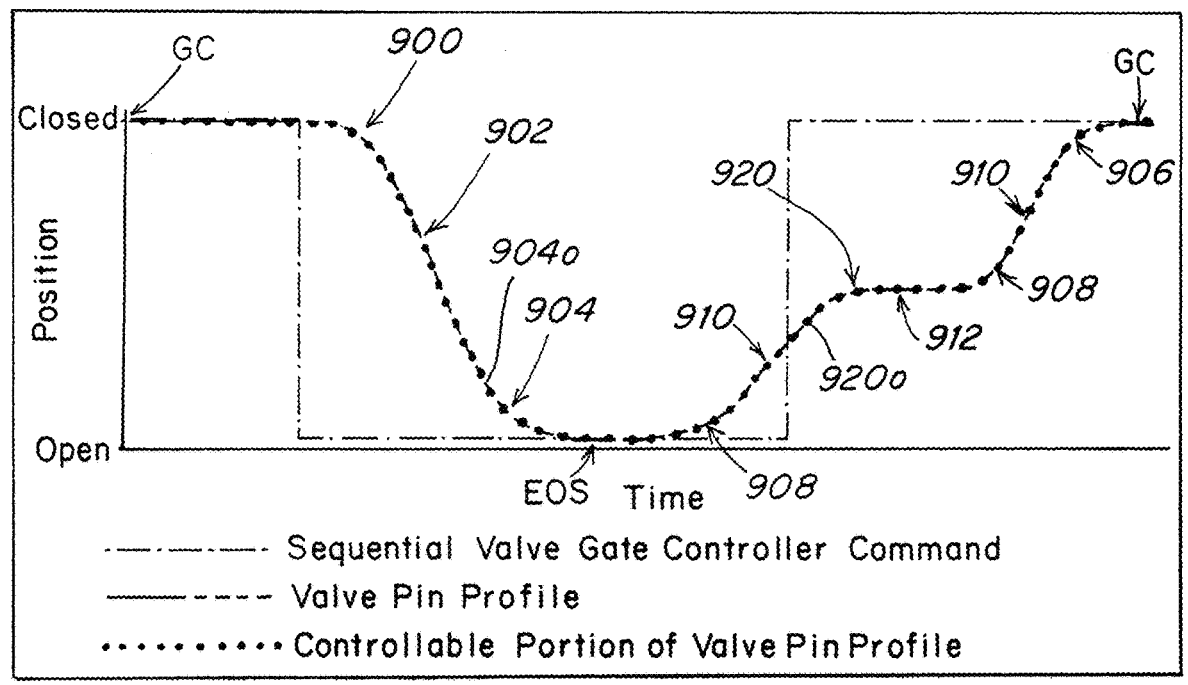
FIG. 6C is a plot of valve pin position versus time during an injection cycle using a valve according the invention where the valve pin is controllably accelerated on opening and decelerated on reaching the end of stroke position and then accelerated on leaving the end of stroke position and then decelerated on approaching a hold position and then accelerated on leaving the hold position and then decelerated on reaching the gate closed position.
Figure 7A:
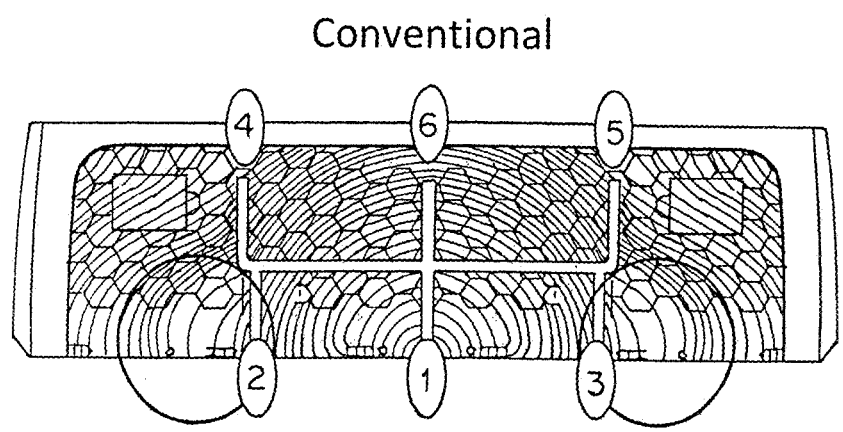
FIG. 7A is a fluid flow, fill or concentration or density map of a sequentially gated mold cavity using a conventional single velocity valve pin opening protocol and valves having conventional configurations that results in a sudden increase in melt or fluid velocity and then a subsequent decrease in melt or fluid velocity in the circled areas of the mold cavity into which the downstream gates labeled 2 and 3 deliver injection fluid from their associated downstream valve channels.
Figure 7B:
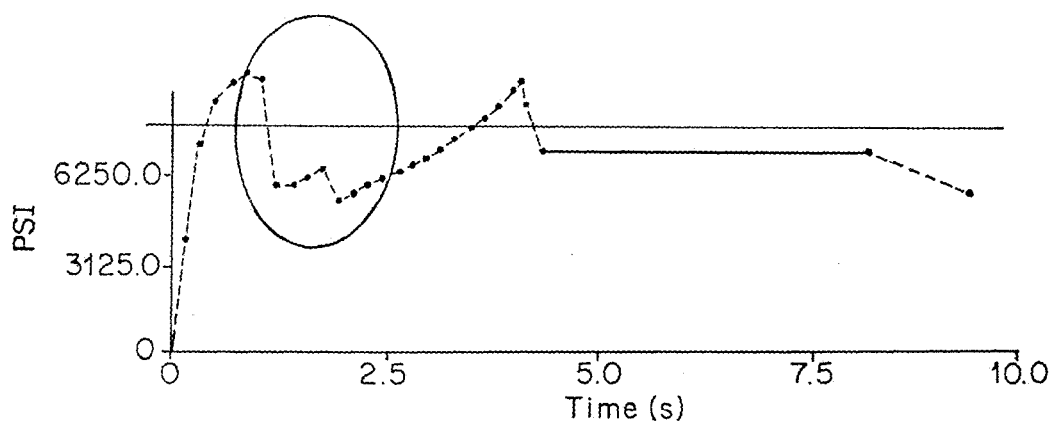
FIG. 7B is a plot of sprue pressure versus time as measured in the downstream valves labeled 2 and 3 in FIG. 7A using the single pin velocity and conventional valve channel and pin configurations that generated the FIG. 7A concentration or density map.
Figure 8A:
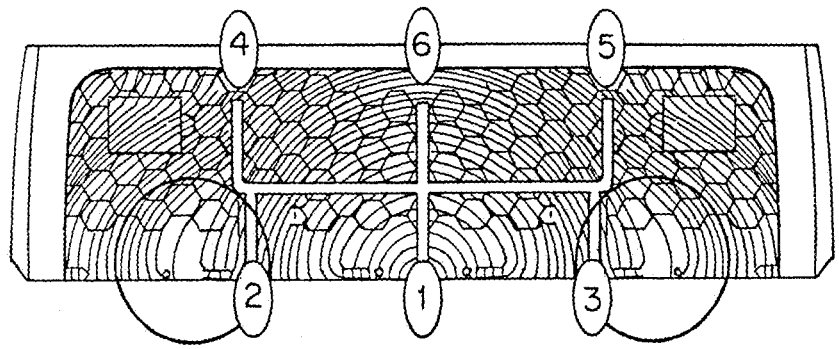
FIG. 8A is a fluid flow, fill or concentration map of a sequentially gated mold cavity using a conventional dual velocity, slow then fast valve pin opening protocol and valves having conventional configurations, resulting in a slight reduction relative to the protocol used to generate FIG. 7A, in melt or fluid velocity of flow into the cavity in the circled areas of the downstream valves 2 and 3.
Figure 8B:
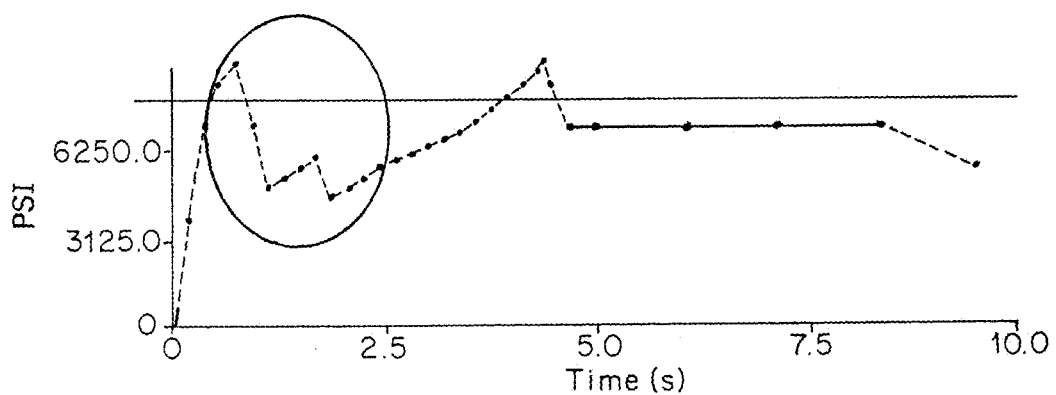
FIG. 8B is a plot of sprue pressure versus time as measured in the downstream valves labeled 2 and 3 in FIG. 8A using the two speed slow then fast pin velocity protocol and conventional valve channel and pin configurations that generated the FIG. 7A fluid concentration or density map.
Figure 9A:
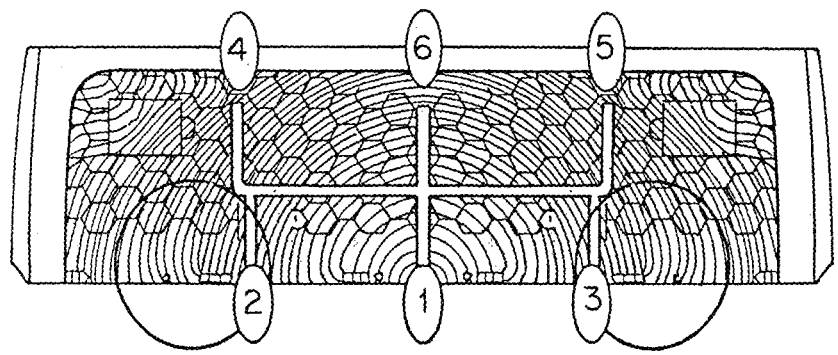
FIG. 9A is a fluid flow, fill density or concentration map of a sequentially gated mold cavity as used in the FIGS. 7A, 8A systems, but instead using a controlled upstream beginning from gate closed single rate of valve pin acceleration protocol according to the invention resulting in a significantly more smooth and uniform distribution and flow of melt fluid delivered from the gates of valves 2 and 3 as well as from the gates of other downstream valves labeled 4, 5, 6 relative to the less uniform melt fluid flow or distribution resulting from use of the pin drive protocols that generates the FIGS. 7A and 8A distribution maps.
Figure 9B:
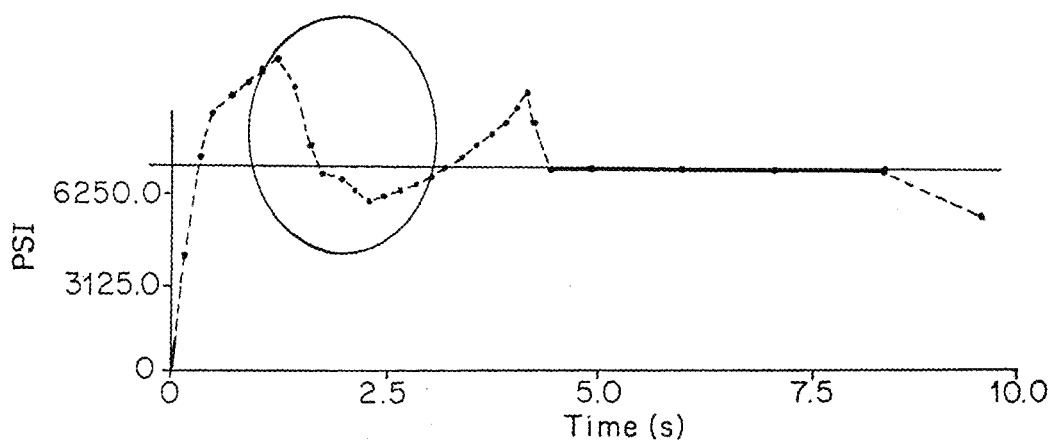
FIG. 9B is a plot of sprue pressure versus time as measured in the downstream valves labeled 2 and 3 in FIG. 9A using the controlled pin acceleration protocol and the novel valve channel and pin configurations as described herein.

As shown in FIGS. 6A, 6B, 6C the controller 16 can include instructions that instruct the actuator 941, 942 to controllably drive the valve pin downstream beginning from a selected open gate position (906*o*) that is upstream of a gate closed position (GC) at a single selected rate of downstream deceleration (906) to the gate closed position (GC). In such an embodiment, the configuration of the control surface (1008) can be selected to interact with the distal axial portion 1041*d* such that flow of injection fluid (18) through the channel gap (CG) is controllable to a selected rate of flow by controllably driving the selected valve pin 1041, 1042 downstream at the single selected rate of downstream deceleration 906 beginning from the selected open gate position (906*o*) to the gate closed position (GC).

As shown in FIGS. 6B, 6C the controller 16 can include instructions that instruct the actuator 941, 942 to controllably drive the valve pin upstream beginning from a selected open gate position (904*o*) that is downstream of an open gate end of stroke position (EOS) at a single selected rate of upstream deceleration (904) to the open gate end of stroke position (EOS). In such an embodiment, the control surface (1008) is formed to have a channel gap (CG) configuration in combination with the configuration of the distal axial portion (1041*d*1) of the selected valve pin (1041) such that the flow of injection fluid (18) through the channel gap (CG) is controllable as the valve pin 1041 reaches the end of stroke EOS position by controllably driving the selected valve pin 1041 upstream at the single selected rate of upstream deceleration (904) beginning from the selected open gate position (904*o*) to the open gate end of stroke position (EOS).

As shown in FIG. 6A, the controller 16 can include instructions that instruct the actuator 941, 942 to controllably drive the valve pin upstream beginning from a selected open gate position (914*o*) that is downstream of a gate open end of stroke position (EOS) at a single selected rate of upstream deceleration to a selected intermediate, zero velocity position (916) between gate closed GC and end of stroke EOS for a selected period of time. In such an embodiment the selected size and configuration of the restriction gap (1006rg) is selected in combination with the configuration of the distal end portion (1041d1) of the selected valve pin (1041) such that the flow of injection fluid (18) through the restriction gap (1006rg) is controllable to a selected rate of flow by controllably driving the selected valve pin upstream at the single selected rate of upstream deceleration beginning from the selected open gate position (914o) to the selected intermediate, zero velocity position (916) between gate closed GC and end of stroke EOS for a selected period of time.

As shown in FIG. 6C the controller 16 can include instructions that instruct the actuator 941, 942 to controllably drive the valve pin at a single selected rate of downstream directed acceleration (908) toward a selected downstream directed constant velocity 910. In such an embodiment, the control surface (1008) can be formed to have a channel gap (CG) configuration in combination with the configuration of the distal axial portion (1041d1) of the selected valve pin (1041) such that flow of injection fluid (18) through the restriction gap (1006rg) is controllable to a selected rate of flow by controllably driving the selected valve pin (1041, 1042) at the single rate of downstream directed acceleration (908) toward the selected downstream directed constant velocity 910.

What is claimed is:

1. A valve for use with an injection molding apparatus, the injection molding apparatus arranged, via an injection molding machine, to inject a flow of injection fluid to a heated manifold, the heated manifold arranged to distribute the injection fluid to a distribution channel, the distribution channel arranged to deliver the injection fluid to a gate of a mold cavity, the valve, comprising:
  a channel having an upstream portion and a downstream portion, the downstream portion having a control surface, wherein the control surface is sloped or configured, conical, cylindrical, straight or curvilinear and wherein the control surface forms a channel gap (CG) having a certain size and configuration disposed upstream of the gate to the mold cavity;
  a valve pin arranged within the channel, the valve pin having a distal axial portion that is adapted to be controllably drivable upstream and downstream along a linear axis (A) of travel through the channel gap (CG); and
  an actuator interconnected to the valve pin, the actuator adapted to controllably drive the interconnected valve pin upstream and downstream through the downstream channel portion of the channel beginning from a gate closed, zero velocity position at a single selected rate of upstream acceleration up to a selected reduced upstream velocity that is less than a maximum velocity at which the valve pin is drivable,
  wherein the certain size and configuration of the channel gap (CG) and the single selected rate of upstream acceleration cooperate to move the injection fluid through the channel gap (CG) at a selected rate of flow on driving the distal axial portion upstream at the single selected rate of upstream acceleration beginning from the gate closed, zero velocity position to the selected reduced upstream velocity; and
  wherein the valve pin is adapted to be driven at the single selected rate of upstream acceleration up to the selected reduced upstream velocity over a path of travel of between about 1 mm and about 5 mm.

2. The valve according to claim 1 wherein the certain size and configuration of the channel gap (CG) provides a certain angle (AG) between the control surface and the linear axis (A) of travel of the valve pin and wherein a smallest diameter (CD) of the control surface or a portion of the control surface is greater than a largest diameter of the distal axial portion.

3. The valve according to claim 1 wherein the upstream channel portion has a conical or tapered or sloped surface disposed upstream relative to the downstream channel portion, the upstream channel portion being sloped or angled (UAG) relative to the linear axis (A) or a circumferential surface of the valve pin by an angle (UAG), the upstream channel portion extending along an axial length (UCT) of the downstream channel such that injection fluid can flow without significant restriction through the upstream channel portion.

4. The valve according to claim 1 wherein the control surface has an angle (AG) relative to the linear axis (A) or a circumferential surface of the valve pin of between about 3 degrees and about 6 degrees.

5. The valve according to claim 1 wherein the upstream channel portion has a conical or tapered or sloped surface disposed upstream relative to the downstream channel portion, wherein the upstream channel portion is sloped or angled (UAG) relative to the linear axis (A) or a circumferential surface of the valve pin, and wherein the control surface has an angle (AG) relative to the linear axis (A) or the circumferential surface of the valve pin of between about 3 degrees and about 6 degrees, and wherein the angle (UAG) is greater than the angle (AG).

6. The valve according to claim 1 wherein the control surface is disposed along an axial length (CT) of between about 3 mm and about 6 mm.

7. The valve according to claim 1 wherein the control surface or a portion of the control surface has a smallest radial diameter (CD) that is greater than a largest radial diameter of the distal axial portion by between about 0.1 mm and about 0.8 mm.

8. The valve according to claim 1 wherein the actuator comprises:
  an electric motor having an electrically driven rotor drivably interconnected to the valve pin in an arrangement that converts rotary motion of the rotor to linear motion of the valve pin.

9. The valve according to claim 1 wherein the selected reduced upstream velocity is less than about 75% of the maximum velocity.

10. A valve for use with an injection molding apparatus, the injection molding apparatus arranged, via an injection molding machine, to inject a flow of injection fluid to a heated manifold, the heated manifold arranged to distribute the injection fluid to a distribution channel, the distribution channel arranged to deliver the injection fluid to a gate of a mold cavity, the valve, comprising:
  a channel having an upstream portion and a downstream portion, the downstream portion having a control surface, wherein the control surface is sloped or configured, conical, cylindrical, straight or curvilinear and wherein the control surface forms a channel gap (CG) having a certain size and configuration disposed upstream of the gate to the mold cavity;
  a valve pin arranged within the channel, the valve pin having a distal axial portion that is adapted to be controllably drivable upstream and downstream along a linear axis (A) of travel through the channel gap (CG);

an actuator interconnected to the valve pin, the actuator adapted to controllably drive the distal axial portion upstream through the channel gap (CG) beginning from a gate closed, zero velocity position up to a selected reduced upstream velocity that is less than a maximum velocity at which the valve pin is drivable, wherein the control surface is disposed along an axial length (CT) of the channel gap (CG) between about 3 mm and about 6 mm, and wherein the control surface or a portion of the control surface has a smallest radial diameter (CD) that is greater than a largest radial diameter of the distal axial portion by between about 0.1 mm and about 0.8 mm; and wherein the valve pin is adapted to be driven at a single selected rate of upstream acceleration up to the selected reduced upstream velocity over a path of travel between about 1 mm and about 5 mm.

11. The valve according to claim 10 wherein the channel gap (CG) and the valve pin are adapted to cooperate with each other to restrict flow of injection fluid through the downstream channel portion along a selected axial length of the downstream channel portion into the mold cavity at one or more selected reduced rates of injection fluid flow when the distal axial portion is withdrawn upstream through the downstream channel portion, the one or more selected reduced rates being less than a maximum rate at which injection fluid flows when the valve pin is disposed in an end of stroke (EOS) position.

12. The valve according to claim 10 wherein the actuator is adapted to drive the distal axial portion upstream through the channel gap (CG) beginning from a gate closed, zero velocity position at a single selected rate of upstream acceleration up to the selected reduced upstream velocity, wherein the certain size and configuration of the channel gap (CG) and the single selected rate of upstream acceleration cooperate to move the injection fluid through the channel gap (CG) at a selected rate of flow on driving the distal axial portion upstream at the single selected rate of upstream acceleration beginning from the gate closed, zero velocity position.

13. The valve according to claim 10 wherein the upstream channel portion has a conical or tapered or sloped or configured surface disposed upstream relative to the downstream channel portion, the upstream channel portion being sloped or angled (UAG) relative to the linear axis (A) or a circumferential surface of the valve pin by an angle (UAG), the upstream channel portion extending along an axial length (UCT) of the downstream channel such that injection fluid can flow without significant restriction through the upstream channel portion.

14. The valve according to claim 10 wherein a rate of flow of injection fluid through the channel gap (CG) is controllable to a selected rate of flow that is less than a maximum rate of flow by controllably driving the valve pin upstream at a single selected rate of upstream acceleration.

15. The valve according to claim 10 wherein the actuator comprises:
an electric motor having an electrically driven rotor drivably interconnected to the valve pin in an arrangement that converts rotary motion of the rotor to linear motion of the valve pin.

16. The valve according to claim 10 wherein the valve pin is adapted to be driven at a single selected rate of upstream acceleration up to the selected reduced upstream velocity over a path of travel of between about 1 mm and about 5 mm.

17. A valve for use with an injection molding apparatus, the injection molding apparatus arranged, via an injection molding machine, to inject a flow of injection fluid to a heated manifold, the heated manifold arranged to distribute the injection fluid to a distribution channel, the distribution channel arranged to deliver the injection fluid to a gate of a mold cavity, the valve, comprising:

a valve pin having a distal axial portion that is adapted to be controllably driven upstream beginning from a gate closed, zero velocity position at a single selected rate of upstream acceleration up to a selected upstream velocity greater than zero;

a downstream channel having a downstream portion, the downstream portion having a conical or tapered or sloped or configured surface that is sloped or angled relative to a linear axis (A) along which the valve pin travels and that forms a channel gap (CG) disposed upstream of the gate to the mold cavity;

an actuator interconnected to the valve pin and configured to controllably drive the interconnected valve pin upstream and downstream through the downstream channel, wherein a slope or taper of the conical or tapered or sloped or configured surface of the downstream channel is arranged to cooperate with the distal axial portion to control a flow of injection fluid through the channel gap (CG) to a selected rate of flow by controllably driving the valve pin upstream at the single selected rate of upstream acceleration beginning from the gate closed, zero velocity position up to the selected upstream velocity greater than zero; and wherein the valve pin is adapted to be driven at the single selected rate of upstream acceleration up to the selected reduced upstream velocity over a path of travel between about 1 mm and about 5 mm.

18. The valve according to claim 17 wherein the conical or tapered or sloped or configured surface is sloped or angled (AG) relative to the linear axis (A) or a circumferential surface of the valve pin by an angle (AG) of between about 3 degrees and about 6 degrees.

19. The valve according to claim 17 wherein the conical or tapered or sloped or configured surface is disposed along an axial length (CT) of between about 3 mm and about 6 mm.

* * * * *